US 8,549,642 B2

(12) United States Patent
Lee

(10) Patent No.: US 8,549,642 B2
(45) Date of Patent: *Oct. 1, 2013

(54) METHOD AND SYSTEM FOR USING SPAM E-MAIL HONEYPOTS TO IDENTIFY POTENTIAL MALWARE CONTAINING E-MAILS

(75) Inventor: Martin Lee, Oxford (GB)

(73) Assignee: Symantec Corporation, Mountain View, CA (US)

( * ) Notice: Subject to any disclaimer, the term of this patent is extended or adjusted under 35 U.S.C. 154(b) by 450 days.

This patent is subject to a terminal disclaimer.

(21) Appl. No.: 12/690,638

(22) Filed: Jan. 20, 2010

(65) Prior Publication Data

US 2011/0179487 A1    Jul. 21, 2011

(51) Int. Cl.
*G06F 11/00* (2006.01)
*G06F 15/16* (2006.01)
*G06F 15/173* (2006.01)
*H04L 29/06* (2006.01)

(52) U.S. Cl.
USPC .............. 726/23; 726/22; 726/24; 709/203; 709/206; 709/224; 713/155

(58) Field of Classification Search
USPC .............. 713/187–188, 193–194; 709/206; 726/13, 22–25
See application file for complete search history.

(56) References Cited

U.S. PATENT DOCUMENTS

| 6,052,709 | A | 4/2000 | Paul |
| 2004/0111632 | A1 | 6/2004 | Halperin |
| 2004/0215977 | A1* | 10/2004 | Goodman et al. ............ 713/201 |
| 2006/0031306 | A1* | 2/2006 | Haverkos .................... 709/206 |
| 2006/0075099 | A1 | 4/2006 | Pearson et al. |
| 2007/0070921 | A1 | 3/2007 | Quinlan et al. |
| 2007/0079379 | A1 | 4/2007 | Sprosts et al. |
| 2007/0220607 | A1* | 9/2007 | Sprosts et al. ................ 726/24 |

OTHER PUBLICATIONS

Portokalidis et al., "SweetBait: Zero-Hour Worm Detection and Containment Using Low- and High-Interaction Honeypots", Computer Networks, vol. 51, No. 5, Jan. 20, 2007, pp. 1256-1274, Elsevier Science Publishers B.V., Amsterdam, NL.

Antrosio et al., "Malware Defense Using Network Security Authentication", *Proceedings of the IEEE International Information Assurance Workshop*, 2005, 13 pages, IEEE.

Comodo, "Undetected Malware Threats a Growing Risk for Internet Users", Press Release, Apr. 1, 2010, 2 pages [online]. Retrieved on Sep. 14, 2010 from Internet: <URL:http://www.prlog.org/10606100-undetected-malware-threats-growing-risk-for-internet-users.html>.

(Continued)

*Primary Examiner* — Evans Desrosiers
(74) *Attorney, Agent, or Firm* — McKay and Hodgson, LLP; Serge J. Hodgson; Sean P. Lewis

(57) ABSTRACT

A method and apparatus for employing honeypot systems to identify potential malware containing messages whereby a decoy system to receive illegitimate e-mails is established. E-mails sent to the spam e-mail honeypot decoy are initially scanned/filtered and e-mails that are not considered possible malware containing e-mails are filtered out while the remaining e-mails sent to the spam e-mail honeypot decoy are identified as potential malware containing e-mails. One or more features, and/or feature values, of the identified e-mails are then identified, extracted and ranked. Once a given feature, and/or feature value, occurs more than a burst threshold number of times, the status of the given feature, and/or feature value, is transformed to that of suspicious e-mail parameter.

20 Claims, 5 Drawing Sheets

(56) References Cited

OTHER PUBLICATIONS

Entrust, Inc., "Fraud Detection Solution Helps Banks Stop Latest Malware Threats", Oct. 28, 2009, 2 pages [online]. Retrieved on Sep. 14, 2010 from the Internet: <URL:http://www.ababj.com/techtopics-plus/entrust-s-fraud-detection-solution-helps-financial-institutions-stop-latest-malware-threats.html>.

Entrust, Inc., "Stopping Man-in-the-Browser—Entrust, TowerGroup Explore Critical Threats, Solutions", News Releases, Feb. 19, 2010, 2 pages [online]. Retrieved on Sep. 14, 2010 from the Internet: <URL:http://www.entrust.com/news/index.php?s=43&item=706>.

Lee, "Method and System for Detecting Malware Containing E-mails Based on Inconsistencies in Public Sector 'From' Addresses and a Sending IP Address", U.S. Appl. No. 12/844,738, filed Jul. 27, 2010.

Tabish et al., "Malware Detection Using Statistical Analysis of Byte-Level File Content", *CSI-KDD '09 Proceedings of the ACM SIGKDD Workshop on CyberSecurity and Intelligence Informatics*, Jun. 28, 2009, 9 pages, ACM, Paris, France.

Xie et al., "pBMDS: A Behavior-based Malware Detection System for Cellphone Devices", *WiSec '10: Proceedings of the Third ACM Conference on Wireless Network Security*, Mar. 2010, pp. 37-48, ACM.

No author provided, "E-mail Authentication", last modified Sep. 1, 2010, 6 pages [online]. Retrieved on Sep. 14, 2010 from the Internet: <URL:http://en.wikipedia.org/wiki/E-mail_authentication>.

No author provided, "E-mail Authentication: Encyclopedia", 4 pages [online]. Retrieved on Sep. 14, 2010 from the Internet: <URL:http://www.associatepublisher.com/e/e/e-mail_authentication.htm>.

Bustamante, "A very large malware honeynet", Dec. 19, 2006, pp. 1-3 [online]. Retrieved on Mar. 9, 2010 from the Internet: <URL:http://research.pandasecurity.com/A-very-large-malware-honeynet/>.

EHOW, "How to Detect an Email Worm", no date provided, one page [online]. Retrieved on Mar. 9, 2010 from the Internet: <URL:http://www.ehow.com/how_2108306_detect-email-worm.html>.

Endicott-Popovsky et al., "Use of Deception to Improve Client Honeypot Detection of Drive-by-Download Attacks", Jul. 15, 2009, Springer Berlin/Heidelberg, abstract, pp. 1-3 [online]. Retrieved on May 4, 2010 from the Internet: <URL:http://www.springerlink.com/content/4227h618nt48345v/>.

Gellert, "Re: Is it one way to detect honeypot?", Feb. 12, 2004, one page [online]. Retrieved on Mar. 9, 2010 from the Internet: <URL:http://lists.virus.org/honeypots-0402/msg00024.html>.

Lam, "E-mail Viruses Detection: Detect E-mail Virus by Network Traffic", Mar. 24, 2002, pp. 1-30.

Lin et al., "Splog Detection Using Content, Time and Link Structures", 2007, pp. 2030-2033, IEEE.

Provos et al., *Virtual Honeypots: From Botnet Tracking to Intrusion Detection*, Aug. 2, 2007, Addison Wesley, description, pp. 1-8 [online]. Retrieved May 4, 2010 from the Internet: <URL:http://www.amazon.co.uk/Virtual-Honeypots-Tracking-Intrusion-Detection/dp/0321336321>.

Riden, "Using Nepenthes Honeypots to Detect Common Malware", Nov. 7, 2006, pp. 1-5 [online]. Retrieved on Mar. 9, 2010 from the Internet: <URL:http://www.securityfocus.com/infocus/1880>.

\* cited by examiner

METHOD AND SYSTEM FOR USING SPAM E-MAIL HONEYPOTS TO IDENTIFY POTENTIAL MALWARE CONTAINING E-MAILS

BACKGROUND OF THE INVENTION

A major problem facing modern computing systems and communications systems is the prevalence of spam and/or scam electronic mail (e-mail). Herein, spam includes any messages, such as, but not limited to, e-mail, or instant messages, that are not requested or desired by the intended receiver of the message. Herein, scam electronic mail is a sub-set of spam e-mail and includes, but is not limited to, a message including: any content that promotes and/or is associated with fraud; any content that promotes and/or is associated with various financial scams; any content that promotes and/or is associated with any criminal activity; and/or any content that promotes and/or is associated with harmful and/or otherwise undesirable content, whether illegal in a given jurisdiction or not.

Another problem facing modern computing systems and communications systems is the prevalence and propagation of malware. Herein, malware includes, but is not limited to, any software and/or code designed to infiltrate a user's computing system without the user's informed and/or explicit consent. Some of the better known forms of malware include computer viruses and spyware.

Despite the fact that malware can be, and often is, distributed/propagated to victim/user computing systems via e-mail, and/or other message attachments, i.e., as attachments to spam, the mechanisms currently used to detect spam and protect a user computing system from spam, and the data obtained via the mechanisms used to detect and protect from spam, are not usually employed to help identify malware and protect a user computing system from malware infection, i.e., currently there is little or no cross-over and/or overlap between spam detection and prevention systems and malware detection and prevention systems.

As an example, one relatively new mechanism used to detect spam is the spam e-mail honeypot, also referred to herein as a "honeypot" or "honeypot system". A spam e-mail honeypot is typically a decoy e-mail system established on a computing system, such as any computing system discussed herein, and/or known in the art at the time of filing, and/or as developed after the time of filing, to receive a large number of e-mails, and/or other messages, sent to decoy e-mail addresses. Generally, the decoy e-mail addresses don't belong to a genuine person or entity. Consequently, the e-mails received by the honeypot via the decoy e-mail addresses are typically not legitimate e-mails from legitimate senders. As a result, at a first cut, it is assumed any e-mails sent to the decoy e-mail addresses and received at the spam e-mail honeypot are indeed spam.

In operation, as the spam e-mail honeypot decoy e-mail addresses become known to spammers, more and more spammers typically add the spam e-mail honeypot decoy e-mail addresses to their user/victim e-mail address databases and more and more spam e-mails are sent to the spam e-mail honeypot decoy e-mail addresses. Consequently, spam e-mail honeypots typically receive large numbers of e-mails, of which the vast majority are simple spam. However, typically, a proportion of the e-mails received at the spam e-mail honeypot may be legitimate. Further, typically, a proportion of the e-mails received at the spam e-mail honeypot also contain malware, i.e., are malware propagating e-mails.

Currently, the fact that a proportion of the e-mails received at the spam e-mail honeypot will also contain malware is largely ignored because the proportion of the e-mails received at the spam e-mail honeypot that also contain malware is typically quite small and because the profile of the particular malware strains and variants received by a spam e-mail honeypot is likely to be different to that received in a non-spam e-mail honeypot environment, i.e., received in a real e-mail system environment. As a result, despite the significant number of malware containing e-mails that are currently received by some spam e-mail honeypots, data and e-mails received by spam e-mail honeypots are currently not being used as a source of data to improve detection rates of malware containing e-mails and to better protect user computing systems. Consequently, numerous user computing systems continue to be infected by viruses and other malware distributed via e-mail. Clearly, this is a far from ideal situation for the victims, but it is also a problem for all users of e-mail who must suffer with the delays of false positive malware results and/or must be wary of all e-mails, even those of legitimate origin and intent.

SUMMARY

According to one embodiment of a method and apparatus for employing honeypot systems to identify potential malware containing messages, a decoy system to receive illegitimate e-mails, i.e., a spam e-mail honeypot, is established. In one embodiment, decoy e-mail addresses are associated with the spam e-mail honeypot that don't, or no longer, belong to a genuine person or entity. Consequently, the spam e-mail decoy e-mails addresses typically do not receive legitimate e-mails from legitimate senders. In one embodiment, e-mails sent to the spam e-mail honeypot decoy e-mail addresses are initially scanned/filtered and e-mails that are not considered possible malware containing e-mails, such as those not including binary attachments or including only non-image binary attachments, are filtered out and are not subjected to further malware detection processing by the method and apparatus for employing honeypot systems to identify potential malware containing messages. In one embodiment, those e-mails sent to the spam e-mail honeypot decoy e-mail addresses that are not filtered out are then considered potential malware containing e-mails. In one embodiment, one or more features, and/or feature values, of the identified potential malware containing e-mails are then identified and extracted. In one embodiment, the extracted features, and/or feature values, are ranked in terms of potential threat and/or an occurrence or "burst" threshold is established for the one or more extracted features, and/or feature values, for a defined period of time such that if a given feature, and/or feature value, occurs more than the burst threshold number of times for the given feature for the defined period of time, the feature, and/or feature value, is considered an indicator of potential illegitimate e-mail traffic, i.e., an indicator of a suspicious e-mail. In one embodiment, once a given feature, and/or feature value, occurs more than the burst threshold number of times for the given feature for the defined period of time, the status of the given feature, and/or feature value, is transformed to that of suspicious e-mail parameter, i.e., a parameter potentially indicative of malware containing e-mails. In one embodiment, once the status of the given feature, and/or feature value, is transformed to that of suspicious e-mail parameter, the suspicious e-mail parameter is distributed to one or more security systems, and/or one or more real e-mail systems, and the suspicious e-mail parameter is used to identify potential malware containing e-mails and/or to initiate one or more actions to protect one or more user computing systems. In one embodiment, after a defined period of time, the suspicious e-mail parameter is retired to avoid false positive results and/or is transformed back to the status of a feature.

As discussed in more detail below, using the method and system for employing honeypot systems to identify potential malware containing messages, in contrast to prior art and current teachings, the significant number of malware containing e-mails received by spam e-mail honeypots is used as a source of data to improve detection rates of malware containing e-mails in a user computing system based environment, i.e., a non-spam e-mail honeypot environment such as a real e-mail system. Therefore, using the method and apparatus for employing honeypot systems to identify potential malware containing messages, as discussed herein, malware containing e-mails can be identified and stopped more frequently and efficiently than is possible using currently available methods and systems.

Figure 1:
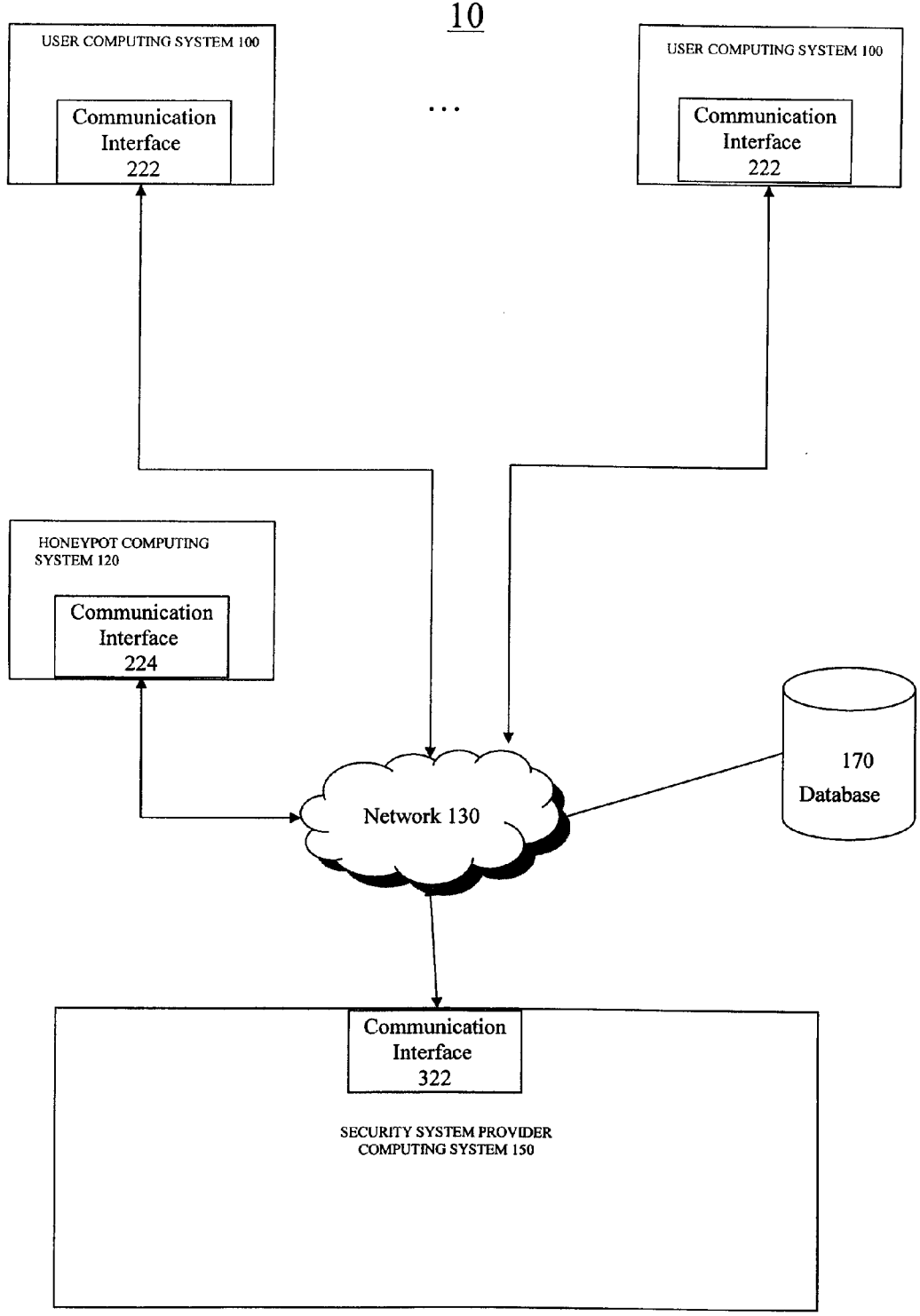
FIG. 1 is a block diagram of an exemplary hardware architecture for implementing one embodiment including a spam e-mail honeypot computing system, user computing systems, a communication network, a database, and a security system provider computing system, in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

According to one embodiment of a method and apparatus for employing honeypot systems to identify potential malware containing messages, a decoy system to receive illegitimate e-mails, i.e., a spam e-mail honeypot, is established. In one embodiment, decoy e-mail addresses are associated with the spam e-mail honeypot that don't, or no longer, belong to a genuine person or entity. Consequently, the spam e-mail decoy e-mails addresses typically do not receive legitimate e-mails from legitimate senders. In one embodiment, e-mails sent to the spam e-mail honeypot decoy e-mail addresses are initially scanned/filtered and e-mails that are not considered possible malware containing e-mails, such as those not including binary attachments or including only non-image binary attachments, are filtered out and are not subjected to further malware detection processing by the method and apparatus for employing honeypot systems to identify potential malware containing messages. In one embodiment, those e-mails sent to the spam e-mail honeypot decoy e-mail addresses that are not filtered out are then considered potential malware containing e-mails. In one embodiment, one or more features, and/or feature values, of the identified potential malware containing e-mails are then identified and extracted. In one embodiment, the extracted features, and/or feature values, are ranked in terms of potential threat and/or an occurrence or "burst" threshold is established for the one or more extracted features, and/or feature values, for a defined period of time such that if a given feature, and/or feature value, occurs more than the burst threshold number of times for the given feature for the defined period of time, the feature, and/or feature value, is considered an indicator of potential illegitimate e-mail traffic, i.e., an indicator of a suspicious e-mail. In one embodiment, once a given feature, and/or feature value, occurs more than the burst threshold number of times for the given feature for the defined period of time, the status of the given feature, and/or feature value, is transformed to that of suspicious e-mail parameter, i.e., a parameter potentially indicative of malware containing e-mails. In one embodiment, once the status of the given feature, and/or feature value, is transformed to that of suspicious e-mail parameter, the suspicious e-mail parameter is distributed to one or more security systems, and/or one or more real e-mail systems, and the suspicious e-mail parameter is used to identify potential malware containing e-mails and/or to initiate one or more actions to protect one or more user computing systems. In one embodiment, after a defined period of time, the suspicious e-mail parameter is retired to avoid false positive results and/or is transformed back to the status of a feature.

In one embodiment, the spam e-mail honeypot is established on a computing system, such as any computing system discussed herein, and/or known in the art at the time of filing, and/or as developed after the time of filing. In one embodiment, the spam e-mail honeypot is a honeypot e-mail server configured to accept large numbers of e-mails sent to it. In one embodiment, the DNS MX records of multiple spam e-mail honeypot domain names are pointed at the spam e-mail honeypot server by one or more processors associated with one or more computing systems to ensure that all of the e-mails sent to the honeypot e-mail domain names are delivered to the honeypot e-mail server. In addition, in some embodiments, different profiles of spam and malware can be selected by acquiring spam e-mail honeypot domain names from various geographies and business sectors to broaden the profile of spam and malware received by the spam e-mail honeypot.

As noted above, in one embodiment, decoy e-mail addresses associated with the spam e-mail honeypot don't belong to a genuine person or entity. Consequently, the spam e-mail honeypot decoy e-mail addresses typically do not receive legitimate e-mails from legitimate senders.

As also noted above, in operation, it is anticipated that as the spam e-mail honeypot decoy e-mail addresses become known to spammers, more and more spammers will add the spam e-mail honeypot decoy e-mail addresses to their user/victim e-mail address databases and more and more spam e-mails will be sent to the spam e-mail honeypot decoy e-mail addresses. Consequently, it is also anticipated that spam e-mail honeypots will receive large numbers of e-mails, of which the vast majority will be simple spam. However, it is also anticipated that a proportion of the e-mails received at the spam e-mail honeypot will be legitimate messages. Further it is anticipated that a proportion of the e-mails received at the spam e-mail honeypot will also contain malware.

As noted above, currently, the fact that a proportion of the e-mails received at the spam e-mail honeypot will also contain malware is largely ignored because the proportion of the e-mails received at the spam e-mail honeypot that will also contain malware is typically quite small. However, according to one embodiment, the fact that as the volume of e-mails received at the spam e-mail honeypot increases, along with the size and capability of spam e-mail honeypots, although the proportion of e-mails containing malware may remain small, the actual number of received malware containing e-mails will become significant is leveraged.

In addition, as noted above, the fact that a proportion of the e-mails received at a spam e-mail honeypot will also contain malware is largely ignored because the profile of the particular malware strains and variants received by a spam e-mail honeypot is likely to be different to that received in a non-spam e-mail honeypot environment. As an example, malware sent by a malware distributor conducting detailed research about the intended recipient is unlikely to be received by a spam e-mail honeypot. However, in one embodiment, the fact that the activities conducted by users of the domain that caused the e-mail addresses of the domain to be identified by spammers are also likely to have brought the addresses to the attention of malware distributors is leveraged.

Consequently, as discussed in more detail below, in contrast to prior art and current teachings, the significant number of malware containing e-mails received by spam e-mail honeypots is used, in one embodiment, as a source of data to improve detection rates of malware containing e-mails in a user computing system based environment, i.e., a non-spam e-mail honeypot environment such as a real e-mail system.

In one embodiment, e-mails sent to the spam e-mail honeypot decoy e-mail addresses are initially scanned/filtered by one or more processors associated with one or more computing systems to separate potential malware containing e-mails in the spam e-mail honeypot from those that are deemed to be incapable of containing malware. For instance, since malware distributed by e-mail typically takes the form of a non-image binary attachment to the e-mail, in one embodiment, a heuristic is implemented by one or more processors associated with one or more computing systems that excludes all e-mails that are text only e-mails, and/or do not include binary attachments, and/or that have only image based binary attachments, from further processing by the method and system for employing honeypot systems to identify potential malware containing messages. In various embodiments, the implementation of this preliminary filtering results in most non-malware containing spam e-mail, and a high proportion of legitimate e-mail, being by-passed to avoid processing costs and false positive results. In one embodiment, the remaining e-mails are considered potential malware containing e-mails although, in practice, the remaining e-mails are typically a mix of malware containing e-mails and legitimate e-mails with a very small proportion of remaining simple spam e-mails. In one embodiment, one or more features, and/or feature values, of the identified potential malware containing e-mails are identified and extracted by one or more processors associated with one or more computing systems. In one embodiment, as discussed in more detail below, malware containing e-mails sent to spam e-mail honeypots tend to contain high numbers of a few malware variants, and therefore high numbers of a given feature, and/or feature value, over a defined period of time. Consequently, similarities can be observed between many of the malware containing e-mails received during a defined time period, even though the hash digests of the binary attachments are often different. On the other hand, legitimate e-mails tend to comprise simple copies of a wide variety of e-mails having a wide variety of features, and/or feature values. In one embodiment, as discussed in more detail below, this fact is used to distinguish malware containing e-mails from the legitimate e-mails received by the spam e-mail honeypot because it is rare that similar features, and/or feature values, can be observed between the legitimate emails received during a defined time period while similar features are often observed between the members of the set of malware containing e-mails in concentrated "bursts".

In various embodiments, the extracted features, and/or feature values, include, but are not limited to: the subject header of the identified potential malware containing e-mails; the filename of any attachment to the identified potential malware containing e-mails; the filenames of files contained within any archive file attachments to identified potential malware containing e-mails such as zip, rar, tar etc. files and the set of character strings found within the attachments to the identified potential malware containing e-mails, and within the files contained with any archive file attachments to the identified potential malware containing e-mails; and/or any other feature, and/or feature value, desired and/or defined by the provider of the method and system for employing honeypot systems to identify potential malware containing messages, and/or one of more users of the method and system for employing honeypot systems to identify potential malware containing messages; and/or any feature, and/or feature value, as discussed herein, and/or as known in the art at the time of filing, and/or as developed after the time of filing.

As noted above, in some embodiments, the extracted features include, but are not limited to, the subject header of the identified potential malware containing e-mails. In one embodiment, the value of the subject header within the potential malware containing e-mails is used since many malware containing e-mails share subject header values or similarities, while this is much less common occurrence for legitimate e-mails received by a spam e-mail honeypot.

As noted above, in some embodiments, the extracted features include, but are not limited to, the filename of any attachment to the identified potential malware containing e-mails. In one embodiment, the filename is identified from the identified potential malware containing e-mail MIME headers.

As noted above, in some embodiments, the extracted features include, but are not limited to, the filenames of files contained within any archive file attachments to identified potential malware containing e-mails such as zip, rar, tar etc. using the fact that if the attachment is an archive, then the archive can be analyzed and the names of the files within the archive can be readily identified by one or more processors associated with one or more computing systems. Similarly, many malware containing e-mails share attachment file names, or have common file names within an archive. However, in contrast, this is a rare occurrence for legitimate e-mails received by a spam e-mail honeypot.

As noted above, in some embodiments, the extracted features include, but are not limited to, the set of character strings found within the attachments to the identified potential malware containing e-mails, and within the files contained with any archive file attachments to the identified potential malware containing e-mails. In the case of character strings, binary files contain areas of contiguous printable characters, where a printable character can be a letter, number, whitespace, or punctuation mark etc., or indeed any defined character including those outside the usual printable range. A character string is defined herein as a set of contiguous defined characters of more than a minimum length found within a binary file attachment to the identified potential malware containing e-mails, or within an extracted file found within an archive type file attachment to the identified potential malware containing e-mails. In one embodiment, the fact that the set of character strings found within the files attached to e-mails form a profile of the attached file is used along with the fact that many of the character strings are common to certain file types and are found in both the attachments to legitimate e-mails and malware containing e-mails, whereas some are strongly associated with certain classes of malware is leveraged.

In one embodiment, the extracted features are ranked in terms of potential threat and/or an occurrence or "burst" threshold is established for the one or more extracted features for a defined period of time such that if a given feature occurs more than the burst threshold number of times for the given feature for the defined period of time, the feature is considered an indicator of potential illegitimate e-mail traffic, i.e., an indicator of a suspicious e-mail.

In one embodiment, the period of time is defined to be any period of time desired, such as, but not limited to: a few minutes, an hour; several hours; a day; or several days.

In one embodiment, within this time period, for each extracted feature type, all the features are compared with a white list of known feature type values and a white list rule base describing patterns within the feature type values that are commonly found within legitimate e-mails using one or more processors associated with one or more computing systems. In one embodiment, any feature type value that is found within the white list or that matches a rule within the white list rule base is considered legitimate and not a candidate for being transformed into a suspicious e-mail parameter, i.e., an indicator of a suspicious e-mail, and is discarded.

As an example, when the extracted feature is the subject header of the identified potential malware containing e-mails, an example of the white list value may be the common value 'Re:' or 'undeliverable', an example of a rule within the white list rule base may be to discard any subject value of less than 3 characters, or a subject value that contains no characters.

As another example, when the extracted feature is the filename of any attachment to the identified potential malware containing e-mails, white list values can be derived by inspection of common legitimate filenames, rules may be to discard filenames of less than a certain length, or to discard filename types that are never found in malware such as '.txt', or unlikely to be found in malware such as '.avi', '.mp3', '.wav' etc.

As another example, when the extracted feature is the filenames of files contained within any archive file attachments to identified potential malware containing e-mails such as zip, rar, tar etc. files and the set of character strings found within the attachments to the identified potential malware containing e-mails, and within the files contained with any archive file attachments to the identified potential malware containing e-mails, there are many values commonly found within legitimate binary files that can be added to a whitelist, such as 'kernel32.dll', 'LoadModule', 'SetErrorInfo' etc. Examples of rules may be to discard any string that does not contain a minimum number of letters, or that only contains numbers etc.

In one embodiment, the extracted features, and/or feature values, are ranked according to frequency of occurrence using the fact that most features, and/or feature values, are encountered only once or twice during the defined time period and that these rarely encountered values can be discarded.

As noted above, in one embodiment, an occurrence or "burst" threshold is established for the one or more extracted features, and/or feature values, for the defined period of time such that if a given feature, and/or feature value, occurs more than the burst threshold number of times for the given feature for the defined period of time, the feature, and/or feature value, is considered an indicator of potential illegitimate e-mail traffic, i.e., an indicator of a suspicious e-mail. This ensures that only highly encountered extracted features, and/or feature values, that are not common features, and/or feature values, contained within the white list and white list rule base are retained and ensures these features, and/or feature values, are currently being encountered in high numbers by the spam e-mail honeypot and are highly likely to be features of malware being sent to the spam e-mail honeypot.

In one embodiment, once a given extracted feature, and/or feature value, occurs more than the burst threshold number of times for the given extracted feature for the defined period of time, the status of the given extracted feature, and/or feature value, is transformed by one or more processors associated with one or more computing systems to that of suspicious e-mail parameter, i.e., a parameter potentially indicative of malware containing e-mails.

In one embodiment, once the status of the given feature, and/or feature value, is transformed to that of suspicious e-mail parameter, the suspicious e-mail parameter is distributed to one or more security systems associated with one or more real, i.e., non-honeypot, e-mail systems by one or more processors associated with one or more computing systems and the suspicious e-mail parameter is used by the one or more security systems to identify potential malware containing e-mails and/or to take action to protect one or more user computing systems. In one embodiment, the suspicious e-mail parameters are distributed to a non-honeypot e-mail system via any network file or string transfer protocol, or by writing the suspicious e-mail parameters to a physical device that can be physically distributed.

In one embodiment, once the suspicious e-mail parameters are distributed to one or more security systems associated with one or more real, i.e., non-honeypot, e-mail systems, within the non-honeypot e-mail system, incoming e-mails are examined by one or more processors associated with one or more computing systems for the presence of any of the suspicious e-mail parameters sent to it by the method and system for employing honeypot systems to identify potential malware containing messages.

As an example, in one embodiment, in the case where the suspicious e-mail parameter is the subject header of the identified potential malware containing e-mails the incoming e-mail is checked for an exact match of the subject value, as well as the presence of a non-image binary attachment.

As another example, in one embodiment, in the case where the suspicious e-mail parameter is the filename of any attachment to the identified potential malware containing e-mails, the MIME headers are checked for the values, and by the unpacking of archive file type attachments and checking the names of packed files.

As another example, in one embodiment, in the case where the suspicious e-mail parameter is the set of character strings found within the attachments to the identified potential malware containing e-mails, the e-mail is checked for the presence of a suitable attachment, or files extracted from an archive type file attachment. These binary files are then scanned for the presence of one or more of the character strings.

In various embodiments, the presence of a suspicious e-mail parameter within an email may be taken as evidence of the email containing malware, or many such matches may need to be taken before the email is considered as malware, or the presence of one or more suspicious e-mail parameters may be considered in the context of a larger malware detection system, as partially contributing to the detection of malware.

In one embodiment, if a suspicious e-mail parameter has not been observed within a defined number of e-mails received by spam e-mail honeypot within a defined time frame, then the suspicious e-mail parameter is removed and transformed back to the status of a feature to avoid false positive results by one or more processors associated with one or more computing systems. In one embodiment, the removal of the suspicious e-mail parameter is communicated to the one or more security systems associated with one or more non-honeypot e-mail systems by one or more processors associated with one or more computing systems. In one embodiment, the removal of the suspicious e-mail parameter expires automatically after a certain time period if it has not been renewed.

Using the method and system for employing honeypot systems to identify potential malware containing messages, discussed herein, in contrast to prior art and current teachings, the significant number of malware containing e-mails received by spam e-mail honeypots is used as a source of data to improve detection rates of malware containing e-mails in a user computing system based environment, i.e., a non-spam e-mail honeypot environment such as a real e-mail system. Therefore, using the method and apparatus for employing honeypot systems to identify potential malware containing messages, as discussed herein, malware containing e-mails can be identified and stopped more frequently and efficiently than is possible using currently available methods and systems.

FIG. 1 shows a block diagram of an exemplary hardware system 10 suitable for implementing one embodiment of a process for employing honeypot systems to identify potential malware containing messages, such as exemplary process 500 of FIG. 5 discussed below. Returning to FIG. 1, exemplary hardware system 10 includes: one or more user computing system(s) 100, including communication interface(s) 222; honeypot computing system 120, including communication interface 224; security system provider computing system 150, including communication interface 322; and database 170; all communicating via communication interfaces 222, 224, 322 and network 130.

In one embodiment, one or more of user computing system(s) 100 are client computing systems. In one embodiment, one or more of user computing system(s) 100 are server computing systems that are, in turn, associated with one or more client computing systems. In one embodiment, one or more of user computing system(s) 100 are representative of multiple user computing systems. In one embodiment, one or more of user computing system(s) 100 are part of a cloud computing environment. In one embodiment, user computing system(s) 100 are used, and/or are accessible, by another computing system, such as security system provider computing system 150 (discussed below) or any one or more of other user computing system(s) 100.

As used herein, the term "computing system", such as is included in the terms "user computing system", "honeypot computing system", and "security system provider computing system" includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, user computing system(s) 100 can be any computing system as defined herein and/or as known in the art at the time of filing and/or as developed thereafter, that includes components that can execute all, or part, of a process for employing honeypot systems to identify potential malware containing messages in accordance with at least one of the embodiments as described herein. A more detailed discussion of user computing system(s) 100 is provided below with respect to FIG. 4.

Returning to FIG. 1, in one embodiment, honeypot computing system 120 is a computing system, such as any computing system discussed herein, and/or known in the art at the time of filing, and/or as developed after the time of filing. In one embodiment, honeypot computing system 120 is a spam e-mail honeypot and is a honeypot e-mail server configured to accept large numbers of e-mails sent to it. In one embodiment, decoy e-mail addresses associated with honeypot computing system 120 don't belong to a genuine person or entity. Consequently, the decoy e-mail addresses of honeypot computing system 120 typically do not receive legitimate e-mails from legitimate senders.

As noted above, in operation, it is anticipated that as the decoy e-mail addresses associated with honeypot computing system 120 become known to spammers, more and more spammers will add the honeypot computing system 120 decoy e-mail addresses to their user/victim e-mail address databases and more and more spam e-mails will be sent to the honeypot computing system 120 decoy e-mail addresses. Consequently, it is also anticipated that honeypot computing system 120 will receive large numbers of e-mails, of which the vast majority will be simple spam. However, it is also anticipated that a proportion of the e-mails received at honeypot computing system 120 will be legitimate messages. Further it is anticipated that a proportion of the e-mails received at honeypot computing system 120 will also contain malware.

As noted above, currently, the fact that a proportion of the e-mails received at honeypot computing system 120 will also contain malware is largely ignored because the proportion of the e-mails received at honeypot computing system 120 that will also contain malware is typically quite small. However, the fact that as the volume of e-mails received at honeypot computing system 120 increases, along with the size and capability of honeypot computing system 120, although the proportion of e-mails containing malware may remain small, the actual number of received malware containing e-mails will become significant is leveraged in one embodiment.

In addition, as noted above, the fact that a proportion of the e-mails received at honeypot computing system 120 will also contain malware is largely ignored in the prior art because the profile of the particular malware strains and variants received by honeypot computing system 120 is likely to be different to that received in a non-spam e-mail honeypot environment. As an example, malware sent by a malware distributor conducting detailed research about the intended recipient is unlikely to be received by honeypot computing system 120. However, the fact that the activities conducted by users of the domain that caused the e-mail addresses of the domain to be identified by spammers are also likely to have brought the addresses to the attention of malware distributors is leveraged in one embodiment.

Consequently, as discussed in more detail below, in contrast to prior art and current teachings, the significant number of malware containing e-mails received by honeypot computing system 120 is used, in one embodiment, as a source of data to improve detection rates of malware containing e-mails in a user computing system based environment, i.e., a non-spam e-mail honeypot environment such as a real e-mail system.

In one embodiment honeypot computing system 120 is part of a cloud computing environment. In one embodiment, honeypot computing system 120 is used, and/or is accessible, by another computing system, such as security system provider computing system 150 (discussed below) or any one or more user computing system(s) 100. A more detailed discussion of honeypot computing system 120 is provided below with respect to FIG. 2.

Returning to FIG. 1, in one embodiment, security system provider computing system 150 is any computing system as defined herein and/or as known in the art at the time of filing and/or as developed thereafter, that includes components that can execute all, or part, of a process for employing honeypot systems to identify potential malware containing messages in accordance with at least one of the embodiments as described herein and is accessible by, controlled by, and/or otherwise associated with, a security system provider. As used herein, a security system provider includes, but is not limited to, any party, person, application, system, or entity that desires to identify and/or block the transmission of malware and/or malware containing messages.

In one embodiment, security system provider computing system 150 is representative of two or more security system provider computing systems. In one embodiment, security system provider computing system 150 is a client computing system associated with one or more server computing systems. In one embodiment, security system provider computing system 150 is a server computing system that is, in turn, associated with one or more client computing systems that are users of one more security systems provided through, or monitored by, the security system provider associated with security system provider computing system 150. In one embodiment, security system provider computing system 150 is part of a cloud computing environment. A more detailed discussion of security system provider computing system 150 is provided below with respect to FIG. 3.

Also shown in FIG. 1 is database 170. In one embodiment, database 170 is a data storage device, a designated server system or computing system, or a designated portion of one or more server systems or computing systems, such as computing system(s) 100, and/or honeypot computing system 120, and/or security system provider computing system 150, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of, or otherwise accessible by, a process for employing honeypot systems to identify potential malware containing messages, and/or a provider of a security system, and/or honeypot computing system 120, and/or a security system provider computing system 150. In one embodiment, database 170 is part of a cloud computing environment.

In one embodiment, computing system(s) 100, honeypot computing system 120, security system provider computing system 150, and database 170, are coupled through network 130. In various embodiments, network 130 is any network, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein, and/or available or known at the time of filing, and/or as developed after the time of filing.

In one embodiment, computing system(s) 100, honeypot computing system 120, security system provider computing system 150, and database 170, are coupled in a cloud computing environment.

Figure 2:
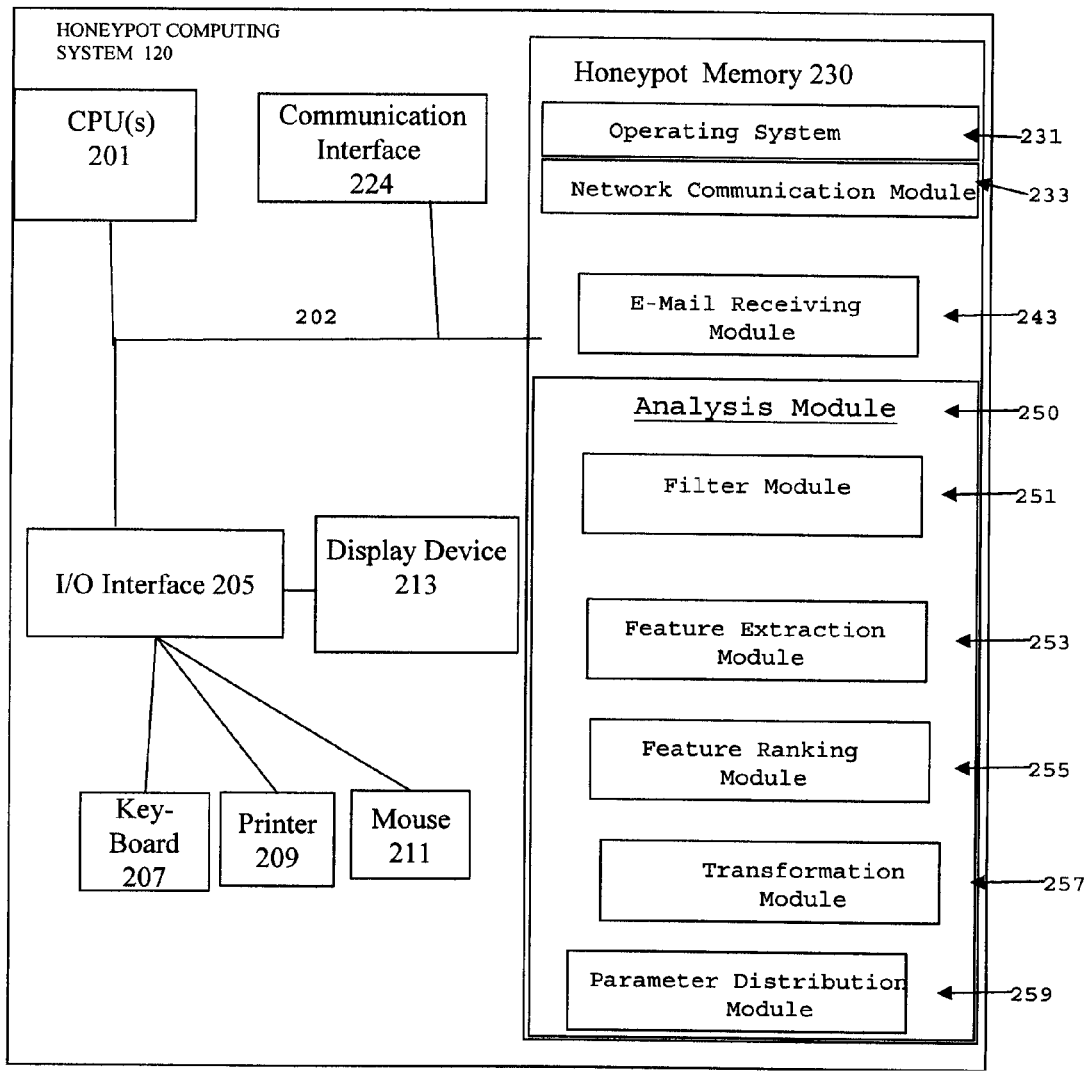
FIG. 2 is a block diagram of an exemplary spam e-mail honey computing system of FIG. 1, in accordance with one embodiment.

FIG. 2 is a more detailed block diagram of an exemplary honeypot computing system 120. As seen in FIG. 2, in one embodiment, honeypot computing system 120 includes one or more Central Processing Unit(s), CPU(s) 201; honeypot memory 230; at least one communication interface 224; an Input/Output interface, I/O interface 205, including one or more user interface devices such as display device 213, keyboard 207, printer 209, and/or mouse 211; all interconnected by one or more communication buses 202

As also seen in FIG. 2, in one embodiment, honeypot memory 230 can store data and/or instructions associated with, but not limited to, the following elements, subsets of elements, and/or super sets of elements for processing by one or more processors, such as CPU(s) 201 (FIG. 2), 301 (FIG. 3), and/or 401 (FIG. 4): operating system 231 that includes procedures, data, and/or instructions for handling various services and performing/coordinating hardware dependent tasks; network communications module 233 that includes procedures, data, and/or instructions, for, along with communication interface 222, connecting honeypot computing system 120 to other computing systems, such as user computing system(s) 100 and/or security system provider computing system 150 of FIG. 1, and/or a network, such as network 130 of FIG. 1, and/or a database, such as database 170 of FIG. 1; e-mail receiving module 243 configured to accept e-mails sent to honeypot computing system 120, as noted above, decoy e-mail addresses associated with honeypot computing system 120 typically don't belong to a genuine person or entity; analysis module 250 (FIG. 2) that includes procedures, data, and/or instructions, for implementing at least part of the process for employing spam e-mail honeypot systems to identify potential malware containing e-mails.

As shown in FIG. 2, in one embodiment, analysis module 250 includes: filter module 251 that includes procedures, data, and/or instructions, for initially scanning/filtering e-mails from e-mail receiving module 243 to identify those e-mails that are not considered possible malware containing e-mails, such as those not including binary attachments or non-image binary attachments, and temporarily identifying all other e-mails as potential malware containing e-mails; feature extraction module 253 that includes procedures, data, and/or instructions, for extracting one or more features, and/or feature values, of the identified potential malware containing e-mails; feature ranking module 255 that includes procedures, data, and/or instructions, for ranking the extracted features of feature extraction module 253 in terms of potential threat and/or defining an occurrence or "burst" threshold for the extracted features of feature extraction module 253; transformation module 257 that includes procedures, data, and/or instructions, for, once a given extracted feature, and/or feature value, occurs more than the burst threshold number of times for the given extracted feature of feature ranking module 255 for a defined period of time, transforming the extracted feature, and/or feature value of feature extraction module 253 to a suspicious e-mail parameter, i.e., a parameter potentially indicative of malware containing e-mails; and parameter distribution module 259 that includes procedures, data, and/or instructions, for distributing the suspicious e-mail parameters of transformation module 257 to one or more security systems associated with one or more real, i.e., non-honeypot, e-mail systems for use by the one or more security systems to identify potential malware containing e-mails and/or to take action to protect one or more user computing systems.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of honeypot computing system 120, honeypot memory 230, and analysis module 243 is provided below with respect to FIG. 5.

Figure 3:
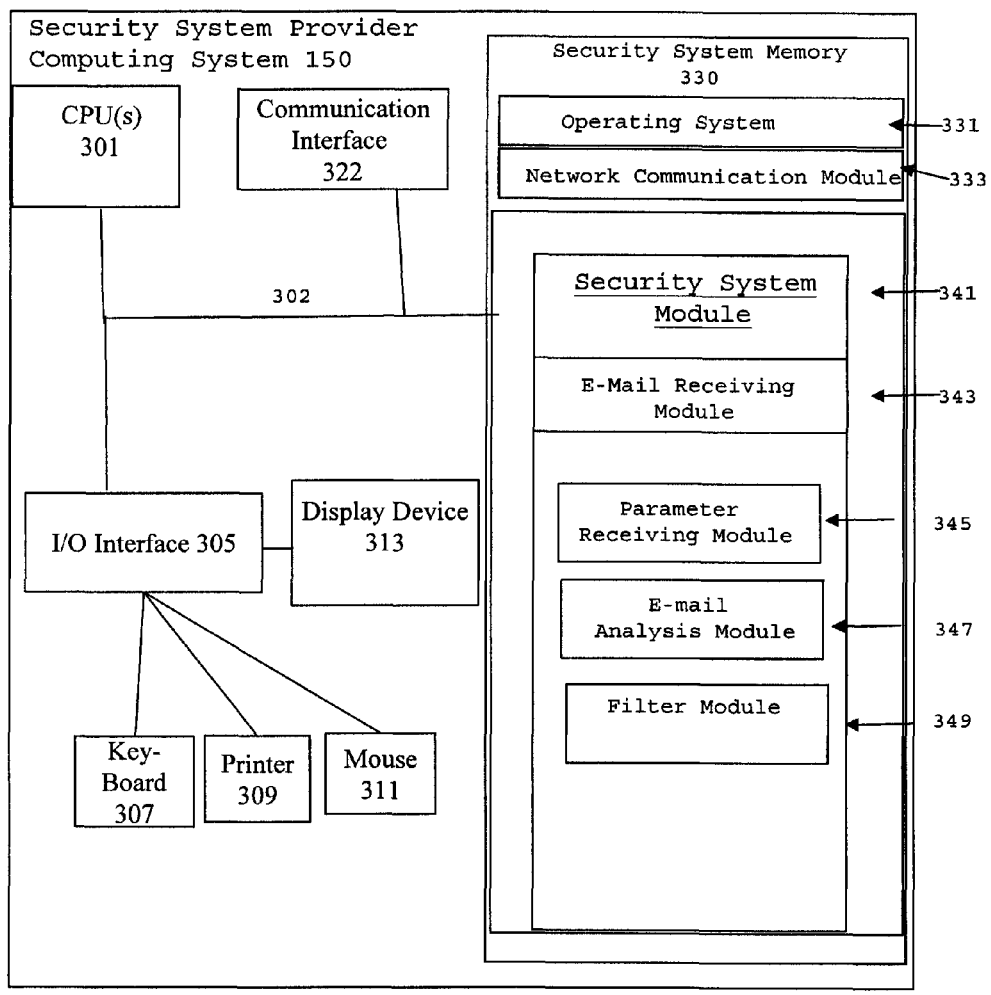
FIG. 3 is a block diagram of an exemplary security system provider computing system of FIG. 1, in accordance with one embodiment.

FIG. 3 is a more detailed block diagram of an exemplary security system provider computing system 150. As seen in FIG. 3, in one embodiment, security system provider computing system 150 includes one or more Central Processing Unit(s), CPU(s) 301; security system memory system 330; at least one communication interface 322; an Input/Output interface, I/O interface 305, including one or more user interface devices such as display device 313, keyboard 307, printer 309, and/or mouse 311; all interconnected by one or more communication buses 302.

As also seen in FIG. 3, in one embodiment, security system memory system 330 can store data and/or instructions associated with, but not limited to, the following elements, subsets of elements, and/or super sets of elements for use in processing by one or more processors, such as CPU(s) 201 (FIG. 2), and/or 301 (FIG. 3), and/or 401 (FIG. 4): operating system 331 that includes procedures, data, and/or instructions for handling various services and performing/coordinating hardware dependent tasks; network communications module 333 that includes procedures, data, and/or instructions, for, along with communication interface 322, connecting security system provider computing system 150 to other computing systems, such as user computing system(s) 100 and/or another security system provider computing system, and/or honeypot computing system 120, and/or a network, such as network 130 of FIG. 1, and/or a database, such as database 170 of FIG. 1; and security system module 341 (FIG. 3) that includes procedures, data, and/or instructions, for intercepting and/or analyzing e-mails being sent to user computing system(s) 100 through security system provider computing system 150 of FIG. 1 and/or to identify and/or block malware containing e-mails.

As also seen in FIG. 3, in one embodiment, security system module 341 of security system memory 330 includes: e-mail receiving module 343 that includes procedures, data, and/or instructions for receiving e-mails sent to user computing system(s) 100; parameter receiving module 345 that includes procedures, data, and/or instructions for receiving, processing, and/or storing the suspicious e-mail parameters from parameter distribution module 259 of honeypot computing system 120; e-mail analysis module 347 that includes procedures, data, and/or instructions for comparing one or more features, and/or feature values, of the e-mails received at e-mail receiving module 343 with the suspicious e-mail parameters of parameter receiving module 345; and filter module 349 that includes procedures, data, and/or instructions for applying one or more protective actions to any e-mails of e-mail receiving module 343 that have one or more features and/or feature values similar to the suspicious e-mail parameters of parameter receiving module 345.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 discussed herein do not limit the scope as claimed below.

A more detailed discussion of the operation of exemplary security system provider computing system 150, security system memory system 330, security system module 341 of security system memory 330, is provided below with respect to FIG. 5.

Figure 4:
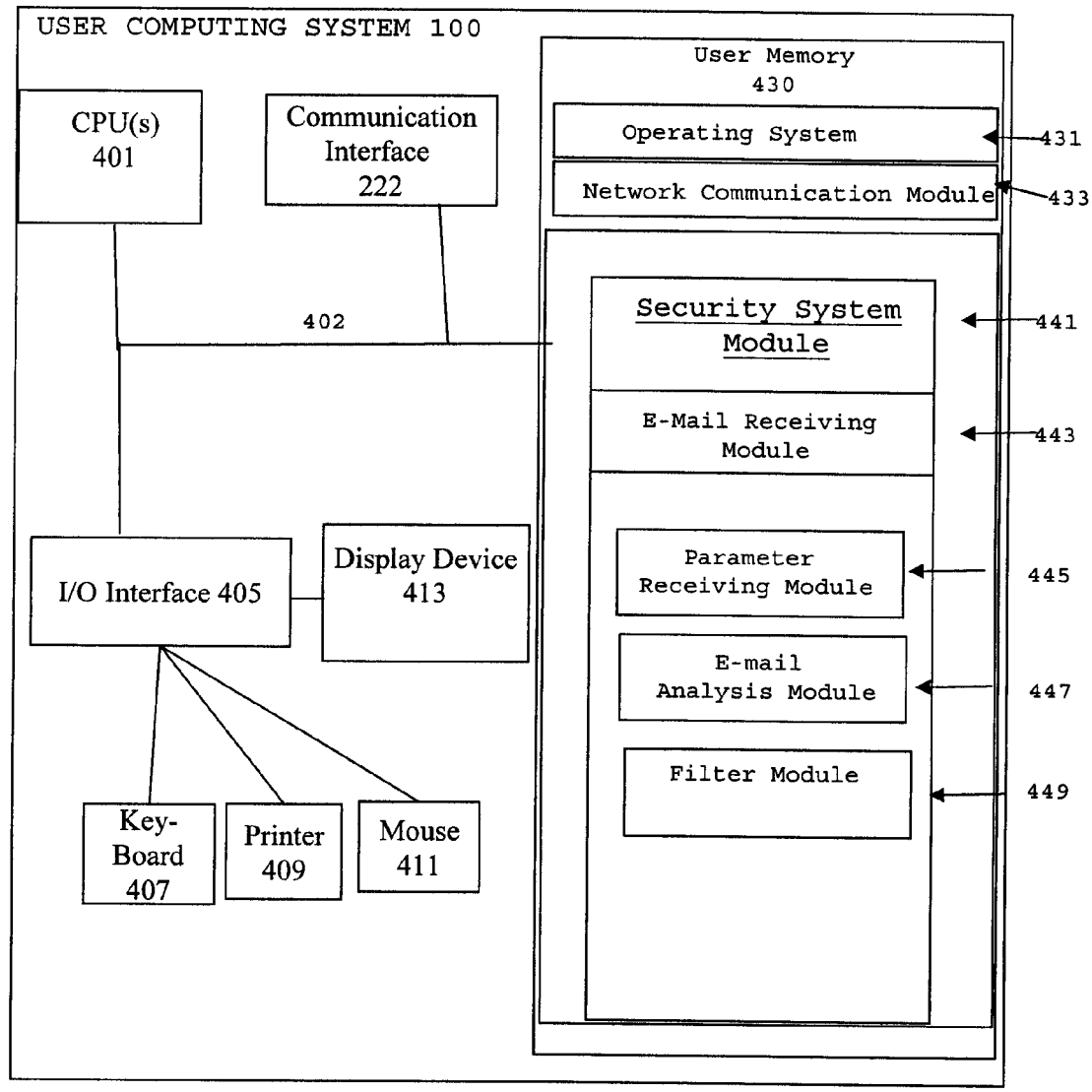
FIG. 4 is a block diagram of an exemplary user computing system of FIG. 1, in accordance with one embodiment.

FIG. 4 is a more detailed block diagram of an exemplary user computing system(s) 100. As seen in FIG. 4, in one embodiment, user computing system(s) 100 include(s) one or more Central Processing Unit(s), CPU(s) 401; user memory 430; at least one communication interface 222; an Input/Output interface, I/O interface 405, including one or more user interface devices such as display device 413, keyboard 407, printer 409, and/or mouse 411; all interconnected by one or more communication buses 402

As also seen in FIG. 4, in one embodiment, user memory 430 can store data and/or instructions associated with, but not limited to, the following elements, subsets of elements, and/or super sets of elements for processing by one or more processors, such as CPU(s) 401, CPU(s) 201 (FIG. 2) and/or 301 (FIG. 3): operating system 431 that includes procedures, data, and/or instructions for handling various services and performing/coordinating hardware dependent tasks; network communications module 433 that includes procedures, data, and/or instructions for, along with communication interface 222, connecting user computing system(s) 100 to other computing systems, such as other user computing system(s) 100, honeypot computing system 120, and/or security system provider computing system 150 of FIG. 1, and/or a network, such as network 130 of FIG. 1, and/or a database, such as database 170 of FIG. 1; and security system module 441 (FIG. 4) that includes procedures, data, and/or instructions, for intercepting and/or analyzing e-mails being sent to user computing system(s) 100 and/or to identify and/or block malware containing e-mails.

As also seen in FIG. 4, in one embodiment, security system module 441 of user memory 430 includes: e-mail receiving module 443 that includes procedures, data, and/or instructions for receiving e-mails sent to user computing system(s) 100; parameter receiving module 445 that includes procedures, data, and/or instructions for receiving, processing, and/or storing the suspicious e-mail parameters from parameter distribution module 259 of honeypot computing system 120; e-mail analysis module 447 that includes procedures, data, and/or instructions for comparing one or more features, and/or feature values, of the e-mails received at e-mail receiving module 443 with the suspicious e-mail parameters of parameter receiving module 445; and filter module 449 that includes procedures, data, and/or instructions for applying one or more protective actions to any e-mails of e-mail receiving module 443 that have one or more features and/or feature values similar to the suspicious e-mail parameters of parameter receiving module 445.

Those of skill in the art will readily recognize that the choice of components, data, modules, and information shown in FIG. 4, the organization of the components, data, modules, and information shown in FIG. 4, and the manner of storage and location of storage of the data, modules, and information shown in FIG. 4 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 4 are illustrative only and not limiting. In various other embodiments, the particular modules and/or data shown in FIG. 4 can be grouped together in fewer modules and/or data locations or divided among more modules and/or data locations. Consequently, those of skill in the art will recognize that other orders and/or grouping are possible and the particular modules and/or data, order, and/or grouping shown in FIG. 4 discussed herein do not limit the scope as claimed below.

A more detailed discussion of the operation of exemplary user computing system(s) 100, user memory 430, and security system module 441 of user memory 430, is provided below with respect to FIG. 5.

Figure 5:
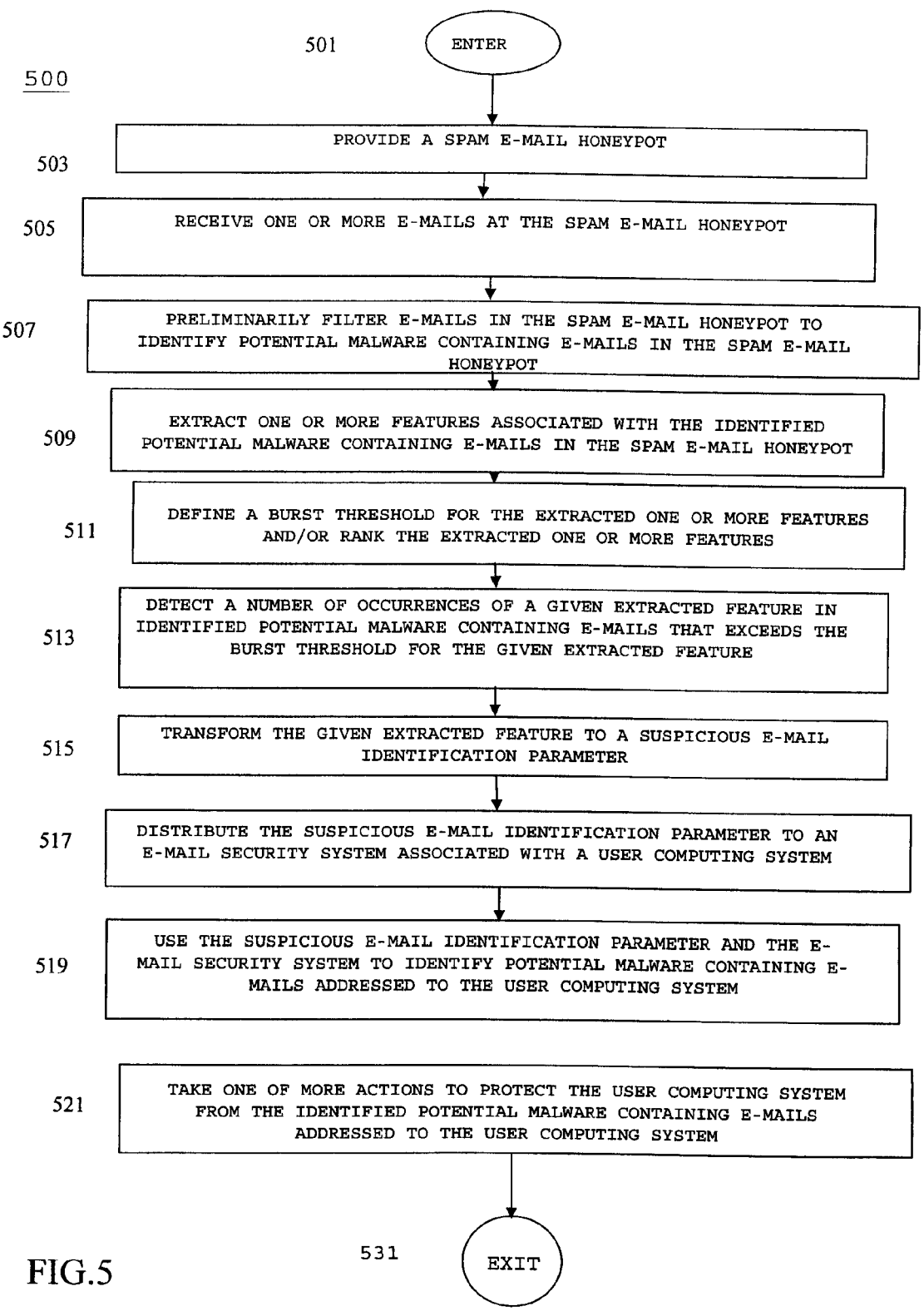
FIG. 5 is a flow chart depicting a process for employing honeypot systems to identify potential malware containing messages in accordance with one embodiment.

FIG. 5 is a flow chart depicting a process for employing honeypot systems to identify potential malware containing messages 500 in accordance with one embodiment.

Process for employing honeypot systems to identify potential malware containing messages 500 begins at ENTER OPERATION 501 and process flow proceeds to PROVIDE A SPAM E-MAIL HONEYPOT OPERATION 503.

In one embodiment, at PROVIDE A SPAM E-MAIL HONEYPOT OPERATION 503 a decoy system to receive illegitimate e-mails, also known as a "honeypot" is established.

In one embodiment, at PROVIDE A SPAM E-MAIL HONEYPOT OPERATION 503 the decoy system to receive illegitimate e-mails, also known as, and referred to herein as, a "honeypot" is established on a honeypot computing system, such as honeypot computing system 120 of FIGS. 1 and 2. In one embodiment, at PROVIDE A SPAM E-MAIL HONEYPOT OPERATION 503 the honeypot is established on a computing system, such as security system provider computing system 150 of FIGS. 1 and 3, or a user computing system, such as any one of computing systems 100 of FIG. 1, or any computing system and/or server system, discussed herein, and/or known in the art at the time of filing, and/or as developed after the time of filing.

Returning to FIG. 5, as noted above, in one embodiment, decoy e-mail addresses associated with the honeypot of PROVIDE A SPAM E-MAIL HONEYPOT OPERATION 503 don't typically belong to a genuine person or entity. Consequently, the honeypot decoy e-mails addresses of PROVIDE A SPAM E-MAIL HONEYPOT OPERATION 503 typically do not receive legitimate e-mails from legitimate senders.

In one embodiment, the spam e-mail honeypot of PROVIDE A SPAM E-MAIL HONEYPOT OPERATION 503 is a honeypot e-mail server configured to accept large numbers of e-mails sent to it. In one embodiment, the DNS MX records of multiple spam e-mail honeypot domain names are pointed at the spam e-mail honeypot server by one or more processors associated with one or more computing systems to ensure that all of the e-mails sent to the honeypot e-mail domain names are delivered to the honeypot e-mail server. In addition, in some embodiments, different profiles of spam and malware can be selected by acquiring spam e-mail honeypot domain names from various geographies and business sectors to broaden the profile of spam and malware received by the spam e-mail honeypot.

As noted above, in one embodiment, decoy e-mail addresses associated with the spam e-mail honeypot of PROVIDE A SPAM E-MAIL HONEYPOT OPERATION 503 typically do not belong to a genuine person or entity. Consequently, the spam e-mail honeypot decoy e-mail addresses typically do not receive legitimate e-mails from legitimate senders. As also noted above, in operation, it is anticipated that as the spam e-mail honeypot decoy e-mail addresses become known to spammers, more and more spammers will add the spam e-mail honeypot decoy e-mail addresses to their user/victim e-mail address databases and more and more spam e-mails will be sent to the spam e-mail honeypot decoy e-mail addresses. Consequently, it is also anticipated that the spam e-mail honeypot of PROVIDE A SPAM E-MAIL HONEYPOT OPERATION 503 will receive large numbers of e-mails, of which the vast majority will be simple spam. However, it is also anticipated that a proportion of the e-mails received at the spam e-mail honeypot of PROVIDE A SPAM E-MAIL HONEYPOT OPERATION 503 will be legitimate messages. Further it is anticipated that a proportion of the e-mails received at the spam e-mail honeypot of PROVIDE A SPAM E-MAIL HONEYPOT OPERATION 503 will also contain malware.

As noted above, currently, the fact that a proportion of the e-mails received at the spam e-mail honeypot of PROVIDE A SPAM E-MAIL HONEYPOT OPERATION 503 will also contain malware is largely ignored because the proportion of the e-mails received at the spam e-mail honeypot of PROVIDE A SPAM E-MAIL HONEYPOT OPERATION 503 that will also contain malware is typically quite small. However, according to one embodiment, the fact that as the volume of e-mails received at the spam e-mail honeypot of PROVIDE A SPAM E-MAIL HONEYPOT OPERATION 503 increases, along with the size and capability of spam e-mail honeypots, although the proportion of e-mails containing malware may remain small, the actual number of received malware containing e-mails will become significant is leveraged.

In addition, as noted above, the fact that a proportion of the e-mails received at the spam e-mail honeypot of PROVIDE A SPAM E-MAIL HONEYPOT OPERATION 503 will also contain malware is largely ignored in the prior art because the profile of the particular malware strains and variants received by the spam e-mail honeypot of PROVIDE A SPAM E-MAIL HONEYPOT OPERATION 503 is likely to be different to that received in a non-spam e-mail honeypot environment. As an example, malware sent by a malware distributor conducting detailed research about the intended recipient is unlikely to be received by the spam e-mail honeypot of PROVIDE A SPAM E-MAIL HONEYPOT OPERATION 503. However, in one embodiment, the fact that the activities conducted by users of the domain that caused the e-mail addresses of the domain to be identified by spammers are also likely to have brought the addresses to the attention of malware distributors is leveraged.

Consequently, as discussed in more detail below, in contrast to current teachings, the significant number of malware containing e-mails received by the spam e-mail honeypot of PROVIDE A SPAM E-MAIL HONEYPOT OPERATION 503 is used, in one embodiment, as a source of data to improve detection rates of malware containing e-mails in a user computing system based environment, i.e., a non-spam e-mail honeypot environment such as a real e-mail system.

In various embodiments, at PROVIDE A SPAM E-MAIL HONEYPOT OPERATION 503 the spam e-mail honeypot, is established using and/or through, and/or by a security system. In one embodiment, the security system is a software application, a software module, a hardware device, and/or a combination of software and hardware, implemented, in whole or in part: on a given user's computing system, such as user computing system(s) 100 of FIGS. 1 and 4; on a security system provider's computing system, such as security system provider computing system 150 of FIGS. 1 and 3; on a third party computing system; on a server computing system; or on any combination of a given user's computing system, a security system provider's computing system, a server computing system, and/or a third party computing system. In one embodiment, the security system is provided via a security system module, such as security system modules 341 and 441 of FIGS. 3 and 4.

Methods, means, mechanisms, procedures and processes for creating and operating decoy e-mail addresses and/or honeypots are well known to those of skill in the art. Consequently, a more detailed discussion of specific methods, means, mechanisms, procedures and processes for creating and operating decoy e-mail addresses and/or honeypots is omitted here to avoid detracting from the invention.

In one embodiment, once a decoy system to receive illegitimate e-mails, also known as a "honeypot" is established at PROVIDE A SPAM E-MAIL HONEYPOT OPERATION 503, process flow proceeds to RECEIVE ONE OR MORE E-MAILS AT THE SPAM E-MAIL HONEYPOT OPERATION 505.

In one embodiment, at RECEIVE ONE OR MORE E-MAILS AT THE SPAM E-MAIL HONEYPOT OPERATION 505 one or more e-mails are received at one or more of the honeypot decoy e-mail addresses of the spam e-mail honeypot of PROVIDE A SPAM E-MAIL HONEYPOT OPERATION 503.

As noted above, in one embodiment, it is anticipated that as honeypot decoy e-mail addresses associated with the spam e-mail honeypot of PROVIDE A SPAM E-MAIL HONEYPOT OPERATION 503 become known, more and more malware propagators will add the honeypot decoy e-mail addresses of PROVIDE A SPAM E-MAIL HONEYPOT OPERATION 503 to their user/victim e-mail address databases and more and more malware containing e-mails will be sent to the honeypot decoy e-mail addresses associated with the spam e-mail honeypot of PROVIDE A SPAM E-MAIL HONEYPOT OPERATION 503.

In one embodiment, at RECEIVE ONE OR MORE E-MAILS AT THE SPAM E-MAIL HONEYPOT OPERATION 505 one or more e-mails are received at one of honeypot decoy e-mail addresses associated with the spam e-mail honeypot of PROVIDE A SPAM E-MAIL HONEYPOT OPERATION 503 via an e-mail receiving module, such as e-mail receiving module 243 of honeypot computing system 120 of FIG. 2.

Returning to FIG. 5, once one or more e-mails are received at one of the honeypot decoy e-mail addresses of the spam e-mail honeypot of PROVIDE A SPAM E-MAIL HONEYPOT OPERATION 503 at RECEIVE ONE OR MORE E-MAILS AT THE SPAM E-MAIL HONEYPOT OPERATION 505, process flow proceeds to PRELIMINARILY FILTER E-MAILS IN THE SPAM E-MAIL HONEYPOT TO IDENTIFY POTENTIAL MALWARE CONTAINING E-MAILS IN THE SPAM E-MAIL HONEYPOT OPERATION 507.

In one embodiment, at PRELIMINARILY FILTER E-MAILS IN THE SPAM E-MAIL HONEYPOT TO IDENTIFY POTENTIAL MALWARE CONTAINING E-MAILS IN THE SPAM E-MAIL HONEYPOT OPERATION 507 e-mails sent to the honeypot decoy e-mail addresses of the spam e-mail honeypot of PROVIDE A SPAM E-MAIL HONEYPOT OPERATION 503 are initially scanned/filtered and e-mails that are not considered possible malware containing e-mails, such as those not including binary attachments or including only non-image binary attachments, are filtered out and are not subjected to further malware detection processing by process for employing honeypot systems to identify potential malware containing messages 500, while those e-mails sent to the spam e-mail honeypot decoy e-mail addresses that are not filtered out are then considered potential malware containing e-mails.

In one embodiment, at PRELIMINARILY FILTER E-MAILS IN THE SPAM E-MAIL HONEYPOT TO IDENTIFY POTENTIAL MALWARE CONTAINING E-MAILS IN THE SPAM E-MAIL HONEYPOT OPERATION 507 e-mails sent to the honeypot decoy e-mail addresses of the spam e-mail honeypot of PROVIDE A SPAM E-MAIL HONEYPOT OPERATION 503 are initially scanned/filtered by one or more processors, such as CPUs 201 of FIG. 2, 301 of FIG. 3, and/or 401 of FIG. 4, associated with one or more computing systems, such as honeypot computing system 120 of FIG. 2, security system provider computing system 150 of FIG. 3, and/or user computing system(s) 100 of FIG. 4, to separate potential malware containing e-mails in the spam e-mail honeypot of PROVIDE A SPAM E-MAIL HONEYPOT OPERATION 503 from those that are deemed to be incapable of containing malware.

For instance, since malware distributed by e-mail typically takes the form of a non-image binary attachment to the e-mail, in one embodiment, at PRELIMINARILY FILTER E-MAILS IN THE SPAM E-MAIL HONEYPOT TO IDENTIFY POTENTIAL MALWARE CONTAINING E-MAILS IN THE SPAM E-MAIL HONEYPOT OPERATION 507, a heuristic is implemented by one or more processors associated with one or more computing systems that excludes all e-mails that are text only e-mails, and/or do not include binary attachments, and/or that have only image based binary attachments, from further processing by process for employing honeypot systems to identify potential malware containing messages.

In various embodiments, the implementation of the preliminary filtering at PRELIMINARILY FILTER E-MAILS IN THE SPAM E-MAIL HONEYPOT TO IDENTIFY POTENTIAL MALWARE CONTAINING E-MAILS IN THE SPAM E-MAIL HONEYPOT OPERATION 507 results in most non-malware containing spam e-mail, and a high proportion of legitimate e-mail, being by-passed to avoid processing costs and false positive results.

In one embodiment, at PRELIMINARILY FILTER E-MAILS IN THE SPAM E-MAIL HONEYPOT TO IDENTIFY POTENTIAL MALWARE CONTAINING E-MAILS IN THE SPAM E-MAIL HONEYPOT OPERATION 507, the remaining e-mails, i.e., those e-mails not filtered out, are considered possible malware containing e-mails, and are temporarily labeled and/or treated as potential malware containing e-mails although, in practice, the remaining e-mails are typically a mix of malware containing e-mails and legitimate e-mails with a very small proportion of remaining simple spam e-mails.

In one embodiment, e-mails sent to the honeypot decoy e-mail addresses of the spam e-mail honeypot of PROVIDE A SPAM E-MAIL HONEYPOT OPERATION 503 are initially scanned/filtered using a filter module, such as filter module 251 of FIG. 2.

In one embodiment, once e-mails sent to the honeypot decoy e-mail addresses of the spam e-mail honeypot of PROVIDE A SPAM E-MAIL HONEYPOT OPERATION 503 are initially scanned/filtered and e-mails that are not considered possible malware containing e-mails, such as those not including binary attachments or including only non-image binary attachments, are filtered out while those e-mails sent to the spam e-mail honeypot decoy e-mail addresses that are not filtered out are labeled potential malware containing e-mails at PRELIMINARILY FILTER E-MAILS IN THE SPAM E-MAIL HONEYPOT TO IDENTIFY POTENTIAL MALWARE CONTAINING E-MAILS IN THE SPAM E-MAIL HONEYPOT OPERATION 507, process flow proceeds to EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509.

In one embodiment, at EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 one or more features, and/or feature values, of the identified potential malware containing e-mails of PRELIMINARILY FILTER E-MAILS IN THE SPAM E-MAIL HONEYPOT TO IDENTIFY POTENTIAL MALWARE CONTAINING E-MAILS IN THE SPAM E-MAIL HONEYPOT OPERATION 507, i.e., the remaining e-mails, are identified and extracted.

In one embodiment, at EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 the one or more features, and/or feature values, of the identified potential malware containing e-mails are identified and extracted by one or more processors, such as CPUs 201 of FIG. 2, 301 of FIG. 3, and/or 401 of FIG. 4, associated with one or more computing systems, such as honeypot computing system 120 of FIG. 2, security system provider computing system 150 of FIG. 3, and/or user computing system(s) 100 of FIG. 4. In one embodiment, at EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 the one or more features, and/or feature values, of the identified potential malware containing e-mails are identified and extracted using a feature extraction module, such as feature extraction module 253 of FIG. 2.

In one embodiment, malware containing e-mails sent to spam e-mail honeypots, such as the spam e-mail honeypot of PROVIDE A SPAM E-MAIL HONEYPOT OPERATION 503 tend to contain high numbers of a few malware variants, and therefore high numbers of a given feature, and/or feature value, over a defined period of time. Consequently, similarities can be observed between many of the malware containing e-mails received during a defined time period, even though the hash digests of the binary attachments are often different. On the other hand, legitimate e-mails tend to comprise simple copies of a wide variety of e-mails having a wide variety of features, and/or feature values. In one embodiment, as discussed in more detail below, this fact is used to distinguish malware containing e-mails from the legitimate e-mails received by the spam e-mail honeypot of PROVIDE A SPAM E-MAIL HONEYPOT OPERATION 503 because it is rare that similar features, and/or feature values, can be observed between the legitimate emails received during a defined time period while similar features are often observed between the members of the set of malware containing e-mails in concentrated "bursts".

In various embodiments, the extracted features, and/or feature values, of EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 include, but are not limited to: the subject header of the identified potential malware containing e-mails; the filename of any attachment to the identified potential malware containing e-mails; the filenames of files contained within any archive file attachments to identified potential malware containing e-mails such as zip, rar, tar etc. files and the set of character strings found within the attachments to the identified potential malware containing e-mails, and within the files contained with any archive file attachments to the identified potential malware containing e-mails; and/or any other feature, and/or feature value, desired and/or defined by the provider of process for employing honeypot systems to identify potential malware containing messages 500, and/or one of more users of process for employing honeypot systems to identify potential malware containing messages 500; and/or any feature, and/or feature value, as discussed herein, and/or as known in the art at the time of filing, and/or as developed after the time of filing.

As noted above, in some embodiments, the extracted features of EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 include, but are not limited to, the subject header of the identified potential malware containing e-mails. In one embodiment, the value of the subject header within the potential malware containing e-mails is used since many malware containing e-mails share subject header values or similarities, while this is much less common occurrence for legitimate e-mails received by a spam e-mail honeypot.

As noted above, in some embodiments, the extracted features of EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 include, but are not limited to, the filename of any attachment to the identified potential malware containing e-mails. In one embodiment, the filename is identified from the identified potential malware containing e-mail MIME headers.

As noted above, in some embodiments, the extracted features of EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 include, but are not limited to, the filenames of files contained within any archive file attachments to identified potential malware containing e-mails such as zip, rar, tar etc. using the fact that if the attachment is an archive, then the archive can be analyzed and the names of the files within the archive can be readily identified by one or more processors associated with one or more computing systems. Similarly, many malware containing e-mails share attachment file names, or have common file names within an archive. However, in contrast, this is a rare occurrence for legitimate e-mails received by a spam e-mail honeypot.

As noted above, in some embodiments, the extracted features of EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 include, but are not limited to, the set of character strings found within the attachments to the identified potential malware containing e-mails, and within the files contained with any archive file attachments to the identified potential malware containing e-mails. In the case of character strings, binary files contain areas of contiguous printable characters, where a printable character can be a letter, number, whitespace, or punctuation mark, etc. A character string is defined herein as a set of contiguous defined characters of more than a minimum length found within a binary file attachment to the identified potential malware containing e-mails, or within an extracted file found within an archive type file attachment to the identified potential malware containing e-mails. In one embodiment, the fact that the set of character strings found within the files attached to e-mails form a profile of the attached file is used along with the fact that many of the character strings are common to certain file types and are found in both the attachments to legitimate e-mails and malware containing e-mails, whereas some are strongly associated with certain classes of malware is leveraged.

In one embodiment, once one or more features, and/or feature values, of the identified potential malware containing e-mails of PRELIMINARILY FILTER E-MAILS IN THE SPAM E-MAIL HONEYPOT TO IDENTIFY POTENTIAL MALWARE CONTAINING E-MAILS IN THE SPAM E-MAIL HONEYPOT OPERATION 507, i.e., the remaining e-mails, are identified and extracted at EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509, process flow proceeds to DEFINE A BURST THRESHOLD FOR THE EXTRACTED ONE OR MORE FEATURES AND/OR RANK THE EXTRACTED ONE OR MORE FEATURES OPERATION 511.

In one embodiment, at DEFINE A BURST THRESHOLD FOR THE EXTRACTED ONE OR MORE FEATURES AND/OR RANK THE EXTRACTED ONE OR MORE FEATURES OPERATION 511 the extracted features, and/or feature values, of EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 are ranked in terms of potential threat and/or an occurrence or "burst" threshold is established for the one or more extracted features, and/or feature values, for a defined period of time such that if a given feature, and/or feature value, occurs more than the burst threshold number of times for the given feature for the defined period of time, the feature, and/or feature value, is considered an indicator of potential illegitimate e-mail traffic, i.e., an indicator of a suspicious e-mail.

In one embodiment, at DEFINE A BURST THRESHOLD FOR THE EXTRACTED ONE OR MORE FEATURES AND/OR RANK THE EXTRACTED ONE OR MORE FEATURES OPERATION 511 the extracted features, and/or feature values, of EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 are ranked in terms of potential threat and/or an occurrence or "burst" threshold is established for the one or more extracted features, and/or feature values, for a defined period of time using one or more processors, such as CPUs 201 of FIG. 2, 301 of FIG. 3, and/or 401 of FIG. 4, associated with one or more computing systems, such as honeypot computing system 120 of FIG. 2, security system provider computing system 150 of FIG. 3, and/or user computing system(s) 100 of FIG. 4.

In one embodiment, at DEFINE A BURST THRESHOLD FOR THE EXTRACTED ONE OR MORE FEATURES AND/OR RANK THE EXTRACTED ONE OR MORE FEATURES OPERATION 511 the extracted features, and/or feature values, of EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 are ranked in terms of potential threat and/or an occurrence or "burst" threshold is established for the one or more extracted features, and/or feature values, for a defined period of time using a feature ranking module, such as feature ranking module 255 of FIG. 2.

In one embodiment, at DEFINE A BURST THRESHOLD FOR THE EXTRACTED ONE OR MORE FEATURES AND/OR RANK THE EXTRACTED ONE OR MORE FEATURES OPERATION 511 the period of time is defined to be any period of time desired, such as, but not limited to: a few minutes, an hour; several hours; a day; or several days.

In one embodiment, at DEFINE A BURST THRESHOLD FOR THE EXTRACTED ONE OR MORE FEATURES AND/OR RANK THE EXTRACTED ONE OR MORE FEATURES OPERATION 511, within the time period, for each extracted feature type, all the features are compared with a white list of known feature type values and a white list rule base describing patterns within the feature type values that are commonly found within legitimate e-mails using one or more processors associated with one or more computing systems. In one embodiment, at DEFINE A BURST THRESHOLD FOR THE EXTRACTED ONE OR MORE FEATURES AND/OR RANK THE EXTRACTED ONE OR MORE FEATURES OPERATION 511 any feature type or value that is found within the white list or that matches a rule within the white list rule base is considered legitimate and not a candidate for being transformed into a suspicious e-mail parameter, i.e., an indicator of a suspicious e-mail, and is therefore discarded.

As an example, in one embodiment, at DEFINE A BURST THRESHOLD FOR THE EXTRACTED ONE OR MORE FEATURES AND/OR RANK THE EXTRACTED ONE OR MORE FEATURES OPERATION 511, when the extracted feature of EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 is the subject header of the identified potential malware containing e-mails, an example of the white list value may be the common value 'Re:' or 'undeliverable', an example of a rule within the white list rule base may be to discard any subject value of less than 3 characters, or a subject value that contains no characters.

As another example, in one embodiment, at DEFINE A BURST THRESHOLD FOR THE EXTRACTED ONE OR MORE FEATURES AND/OR RANK THE EXTRACTED ONE OR MORE FEATURES OPERATION 511, when the extracted feature of EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 is the filename of any attachment to the identified potential malware containing e-mails, white list values can be derived by inspection of common legitimate filenames, rules may be to discard filenames of less than a certain length, or to discard filename types that that are never found in malware such as or unlikely to be found in malware such as '.avi', '.mp3', '.wav' etc.

As another example, in one embodiment, at DEFINE A BURST THRESHOLD FOR THE EXTRACTED ONE OR MORE FEATURES AND/OR RANK THE EXTRACTED ONE OR MORE FEATURES OPERATION 511, when the extracted feature of EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 is the filenames of files contained within any archive file attachments to identified potential malware containing e-mails such as zip, rar, tar, etc. files and the set of character strings found within the attachments to the identified potential malware containing e-mails, and within the files contained with any archive file attachments to the identified potential malware containing e-mails, there are many values commonly found within legitimate binary files that can be added to a whitelist, such as 'kernel32.dll', 'LoadModule', 'SetErrorInfo' etc. Examples of rules may be to discard any string that does not contain a minimum number of letters, or that only contains numbers etc.

In one embodiment, at DEFINE A BURST THRESHOLD FOR THE EXTRACTED ONE OR MORE FEATURES AND/OR RANK THE EXTRACTED ONE OR MORE FEATURES OPERATION 511, the extracted features, and/or feature values, of EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 are ranked according to frequency of occurrence using the fact that most features, and/or feature values, are encountered only once or twice during the defined time period and that these rarely encountered values can be discarded.

As noted above, in one embodiment, at DEFINE A BURST THRESHOLD FOR THE EXTRACTED ONE OR MORE FEATURES AND/OR RANK THE EXTRACTED ONE OR MORE FEATURES OPERATION 511 an occurrence or "burst" threshold is established for the one or more extracted features, and/or feature values, of EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 for the defined period of time such that if a given feature, and/or feature value, occurs more than the burst threshold number of times for the given feature for the defined period of time, the feature, and/or feature value, is considered an indicator of potential illegitimate e-mail traffic, i.e., an indicator of a suspicious e-mail. This ensures that only highly encountered extracted features, and/or feature values, that are not common features, and/or feature values, contained within the white list and white list rule base are retained and ensures these features, and/or feature values, are currently being encountered in high numbers by the spam e-mail honeypot and are highly likely to be features of malware being sent to the spam e-mail honeypot.

In one embodiment, once the extracted features, and/or feature values, of EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 are ranked in terms of potential threat and/or an occurrence or "burst" threshold is established for the one or more extracted features, and/or feature values, for a defined period of time such that if a given feature, and/or feature value, occurs more than the burst threshold number of times for the given feature for the defined period of time, the feature, and/or feature value, is considered an indicator of potential illegitimate e-mail traffic, i.e., an indicator of a suspicious e-mail, at DEFINE A BURST THRESHOLD FOR THE EXTRACTED ONE OR MORE FEATURES AND/OR RANK THE EXTRACTED ONE OR MORE FEATURES OPERATION 511, process flow proceeds to DETECT A NUMBER OF OCCURRENCES OF A GIVEN EXTRACTED FEATURE IN IDENTIFIED POTENTIAL MALWARE CONTAINING E-MAILS THAT EXCEEDS THE BURST THRESHOLD FOR THE GIVEN EXTRACTED FEATURE OPERATION 513.

In one embodiment, at DETECT A NUMBER OF OCCURRENCES OF A GIVEN EXTRACTED FEATURE IN IDENTIFIED POTENTIAL MALWARE CONTAINING E-MAILS THAT EXCEEDS THE BURST THRESHOLD FOR THE GIVEN EXTRACTED FEATURE OPERATION 513 e-mails received at the spam e-mail honeypot of PROVIDE A SPAM E-MAIL HONEYPOT OPERATION 503 are monitored and one or more extracted features, and/or feature values, of EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 occur in one or more e-mails received at the spam e-mail honeypot of PROVIDE A SPAM E-MAIL HONEYPOT OPERATION 503 more than the burst threshold number of times for the extracted features for the defined period of time of DEFINE A BURST THRESHOLD FOR THE EXTRACTED ONE OR MORE FEATURES AND/OR RANK THE EXTRACTED ONE OR MORE FEATURES OPERATION 511.

In one embodiment, at DETECT A NUMBER OF OCCURRENCES OF A GIVEN EXTRACTED FEATURE IN IDENTIFIED POTENTIAL MALWARE CONTAINING E-MAILS THAT EXCEEDS THE BURST THRESHOLD FOR THE GIVEN EXTRACTED FEATURE OPERATION 513 e-mails received at the spam e-mail honeypot of PROVIDE A SPAM E-MAIL HONEYPOT OPERATION 503 are monitored using one or more processors, such as CPUs 201 of FIG. 2, 301 of FIG. 3, and/or 401 of FIG. 4, associated with one or more computing systems, such as honeypot computing system 120 of FIG. 2, security system provider computing system 150 of FIG. 3, and/or user computing system(s) 100 of FIG. 4. In one embodiment, at EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 the one or more features, and/or feature values, of the identified potential malware containing e-mails are identified and extracted using a feature extraction module, such as feature extraction module 253 of FIG. 2.

In one embodiment, once e-mails received at the spam e-mail honeypot of PROVIDE A SPAM E-MAIL HONEYPOT OPERATION 503 are monitored and one or more extracted features, and/or feature values, of EXTRACT ONE OR MORE FEATURES ASSOCIATED WITH THE IDENTIFIED POTENTIAL MALWARE CONTAINING E-MAILS IN THE SPAM E-MAIL HONEYPOT OPERATION 509 occur in one or more e-mails received at the spam e-mail honeypot of PROVIDE A SPAM E-MAIL HONEYPOT OPERATION 503 more than the burst threshold number of times for the extracted features for the defined period of time of DEFINE A BURST THRESHOLD FOR THE EXTRACTED ONE OR MORE FEATURES AND/OR RANK THE EXTRACTED ONE OR MORE FEATURES OPERATION 511 at DETECT A NUMBER OF OCCURRENCES OF A GIVEN EXTRACTED FEATURE IN IDENTIFIED POTENTIAL MALWARE CONTAINING E-MAILS THAT EXCEEDS THE BURST THRESHOLD FOR THE GIVEN EXTRACTED FEATURE OPERATION 513 process flow proceeds to TRANSFORM THE GIVEN EXTRACTED FEATURE TO A SUSPICIOUS E-MAIL IDENTIFICATION PARAMETER OPERATION 515.

In one embodiment, at TRANSFORM THE GIVEN EXTRACTED FEATURE TO A SUSPICIOUS E-MAIL IDENTIFICATION PARAMETER OPERATION 515 once a given feature, and/or feature value, is detected as occurring more than the burst threshold number of times for the given feature for the defined period of time at DETECT A NUMBER OF OCCURRENCES OF A GIVEN EXTRACTED FEATURE IN IDENTIFIED POTENTIAL MALWARE CONTAINING E-MAILS THAT EXCEEDS THE BURST THRESHOLD FOR THE GIVEN EXTRACTED FEATURE OPERATION 513, the status of the given feature, and/or feature value, is transformed to that of suspicious e-mail parameter, i.e., a parameter potentially indicative of malware containing e-mails.

In one embodiment, at TRANSFORM THE GIVEN EXTRACTED FEATURE TO A SUSPICIOUS E-MAIL IDENTIFICATION PARAMETER OPERATION 515 once a given feature, and/or feature value, is detected as occurring more than the burst threshold number of times for the given feature for the defined period of time at DETECT A NUMBER OF OCCURRENCES OF A GIVEN EXTRACTED FEATURE IN IDENTIFIED POTENTIAL MALWARE CONTAINING E-MAILS THAT EXCEEDS THE BURST THRESHOLD FOR THE GIVEN EXTRACTED FEATURE OPERATION 513, the status of the given feature, and/or feature value, is transformed to that of suspicious e-mail parameter, i.e., a parameter potentially indicative of malware containing e-mails, using one or more processors, such as CPUs 201 of FIG. 2, 301 of FIG. 3, and/or 401 of FIG. 4, associated with one or more computing systems, such as honeypot computing system 120 of FIG. 2, security system provider computing system 150 of FIG. 3, and/or user computing system(s) 100 of FIG. 4.

In one embodiment, at TRANSFORM THE GIVEN EXTRACTED FEATURE TO A SUSPICIOUS E-MAIL IDENTIFICATION PARAMETER OPERATION 515 once a given feature, and/or feature value, is detected as occurring more than the burst threshold number of times for the given feature for the defined period of time at DETECT A NUMBER OF OCCURRENCES OF A GIVEN EXTRACTED FEATURE IN IDENTIFIED POTENTIAL MALWARE CONTAINING E-MAILS THAT EXCEEDS THE BURST THRESHOLD FOR THE GIVEN EXTRACTED FEATURE OPERATION 513, the status of the given feature, and/or feature value, is transformed to that of suspicious e-mail parameter, i.e., a parameter potentially indicative of malware containing e-mails, using a transformation module, such as transformation module 257 of FIG. 2.

In one embodiment, once a given feature, and/or feature value, is detected as occurring more than the burst threshold number of times for the given feature for the defined period of time at DETECT A NUMBER OF OCCURRENCES OF A GIVEN EXTRACTED FEATURE IN IDENTIFIED POTENTIAL MALWARE CONTAINING E-MAILS THAT EXCEEDS THE BURST THRESHOLD FOR THE GIVEN EXTRACTED FEATURE OPERATION 513, and the status of the given feature, and/or feature value, is transformed to that of suspicious e-mail parameter, i.e., a parameter potentially indicative of malware containing e-mails, at TRANSFORM THE GIVEN EXTRACTED FEATURE TO A SUSPICIOUS E-MAIL IDENTIFICATION PARAMETER OPERATION 515, process flow proceeds to DISTRIBUTE THE SUSPICIOUS E-MAIL IDENTIFICATION PARAMETER TO AN E-MAIL SECURITY SYSTEM ASSOCIATED WITH A USER COMPUTING SYSTEM OPERATION 517.

In one embodiment, at DISTRIBUTE THE SUSPICIOUS E-MAIL IDENTIFICATION PARAMETER TO AN E-MAIL SECURITY SYSTEM ASSOCIATED WITH A USER COMPUTING SYSTEM OPERATION 517 once the status of the given feature, and/or feature value, is transformed to that of suspicious e-mail parameter at TRANSFORM THE GIVEN EXTRACTED FEATURE TO A SUSPICIOUS E-MAIL IDENTIFICATION PARAMETER OPERATION 515, the suspicious e-mail parameter is distributed to one or more security systems and/or "real e-mail systems" for use in identifying potential malware containing e-mails and/or to initiate one or more actions to protect one or more user computing systems.

In one embodiment, at DISTRIBUTE THE SUSPICIOUS E-MAIL IDENTIFICATION PARAMETER TO AN E-MAIL SECURITY SYSTEM ASSOCIATED WITH A USER COMPUTING SYSTEM OPERATION 517 once the status of the given feature, and/or feature value, is transformed to that of suspicious e-mail parameter, the suspicious e-mail parameter is distributed to one or more security systems associated with one or more real, i.e., non-honeypot, e-mail systems by one or more processors, such as CPUs 201 of FIG. 2, 301 of FIG. 3, and/or 401 of FIG. 4, associated with one or more computing systems, such as honeypot computing system 120 of FIG. 2, security system provider computing system 150 of FIG. 3, and/or user computing system(s) 100 of FIG. 4.

In one embodiment, at DISTRIBUTE THE SUSPICIOUS E-MAIL IDENTIFICATION PARAMETER TO AN E-MAIL SECURITY SYSTEM ASSOCIATED WITH A USER COMPUTING SYSTEM OPERATION 517 once the status of the given feature, and/or feature value, is transformed to that of suspicious e-mail parameter, the suspicious e-mail parameter is distributed to one or more security systems associated with one or more real, i.e., non-honeypot, e-mail systems using parameter distribution module 260 of FIG. 2 and parameter receiving modules 345 of FIG. 3 and/or 445 of FIG. 4.

In one embodiment, at DISTRIBUTE THE SUSPICIOUS E-MAIL IDENTIFICATION PARAMETER TO AN E-MAIL SECURITY SYSTEM ASSOCIATED WITH A USER COMPUTING SYSTEM OPERATION 517 once the status of the given feature, and/or feature value, is transformed to that of suspicious e-mail parameter, the suspicious e-mail parameter is distributed to one or more security systems associated with one or more real, i.e., non-honeypot, e-mail systems using any network file or string transfer protocol, or by writing the suspicious e-mail parameters to a physical device that can be physically distributed.

In one embodiment, once the status of the given feature, and/or feature value, is transformed to that of suspicious e-mail parameter at TRANSFORM THE GIVEN EXTRACTED FEATURE TO A SUSPICIOUS E-MAIL IDENTIFICATION PARAMETER OPERATION 515, and the suspicious e-mail parameter is distributed to one or more security systems and/or "real e-mail systems" for use in identifying potential malware containing e-mails at DISTRIBUTE THE SUSPICIOUS E-MAIL IDENTIFICATION PARAMETER TO AN E-MAIL SECURITY SYSTEM ASSOCIATED WITH A USER COMPUTING SYSTEM OPERATION 517, process flow proceeds to USE THE SUSPICIOUS E-MAIL IDENTIFICATION PARAMETER AND THE E-MAIL SECURITY SYSTEM TO IDENTIFY POTENTIAL MALWARE CONTAINING E-MAILS ADDRESSED TO THE USER COMPUTING SYSTEM OPERATION 519.

In one embodiment, at USE THE SUSPICIOUS E-MAIL IDENTIFICATION PARAMETER AND THE E-MAIL SECURITY SYSTEM TO IDENTIFY POTENTIAL MALWARE CONTAINING E-MAILS ADDRESSED TO THE USER COMPUTING SYSTEM OPERATION 519 the suspicious e-mail parameters of DISTRIBUTE THE SUSPICIOUS E-MAIL IDENTIFICATION PARAMETER TO AN E-MAIL SECURITY SYSTEM ASSOCIATED WITH A USER COMPUTING SYSTEM OPERATION 517 are used to identify potential malware containing e-mails.

In one embodiment, at USE THE SUSPICIOUS E-MAIL IDENTIFICATION PARAMETER AND THE E-MAIL SECURITY SYSTEM TO IDENTIFY POTENTIAL MALWARE CONTAINING E-MAILS ADDRESSED TO THE USER COMPUTING SYSTEM OPERATION 519 the suspicious e-mail parameters of DISTRIBUTE THE SUSPICIOUS E-MAIL IDENTIFICATION PARAMETER TO AN E-MAIL SECURITY SYSTEM ASSOCIATED WITH A USER COMPUTING SYSTEM OPERATION 517 are used to identify potential malware containing e-mails sent to a user computing system, such as user computing system 100 of FIG. 4.

In one embodiment, at USE THE SUSPICIOUS E-MAIL IDENTIFICATION PARAMETER AND THE E-MAIL SECURITY SYSTEM TO IDENTIFY POTENTIAL MALWARE CONTAINING E-MAILS ADDRESSED TO THE USER COMPUTING SYSTEM OPERATION 519 the suspicious e-mail parameters of DISTRIBUTE THE SUSPICIOUS E-MAIL IDENTIFICATION PARAMETER TO AN E-MAIL SECURITY SYSTEM ASSOCIATED WITH A USER COMPUTING SYSTEM OPERATION 517 are used to identify potential malware containing e-mails sent to a user computing system, such as user computing system 100 of FIG. 4, through a security system provider computing system, such as security system provider computing system 150 of FIG. 3.

In one embodiment, at USE THE SUSPICIOUS E-MAIL IDENTIFICATION PARAMETER AND THE E-MAIL SECURITY SYSTEM TO IDENTIFY POTENTIAL MALWARE CONTAINING E-MAILS ADDRESSED TO THE USER COMPUTING SYSTEM OPERATION 519 the suspicious e-mail parameters of DISTRIBUTE THE SUSPICIOUS E-MAIL IDENTIFICATION PARAMETER TO AN E-MAIL SECURITY SYSTEM ASSOCIATED WITH A USER COMPUTING SYSTEM OPERATION 517 are used to identify potential malware containing e-mails using one or more processors, such as CPUs 201 of FIG. 2, 301 of FIG. 3, and/or 401 of FIG. 4, associated with one or more computing systems, such as honeypot computing system 120 of FIG. 2, security system provider computing system 150 of FIG. 3, and/or user computing system(s) 100 of FIG. 4.

In one embodiment, at USE THE SUSPICIOUS E-MAIL IDENTIFICATION PARAMETER AND THE E-MAIL SECURITY SYSTEM TO IDENTIFY POTENTIAL MALWARE CONTAINING E-MAILS ADDRESSED TO THE USER COMPUTING SYSTEM OPERATION 519 the suspicious e-mail parameters of DISTRIBUTE THE SUSPICIOUS E-MAIL IDENTIFICATION PARAMETER TO AN E-MAIL SECURITY SYSTEM ASSOCIATED WITH A USER COMPUTING SYSTEM OPERATION 517 are used to identify potential malware containing e-mails using filter module, such as filter module 349 of FIG. 3 and/or 449 of FIG. 4.

As an example, in one embodiment, at USE THE SUSPICIOUS E-MAIL IDENTIFICATION PARAMETER AND THE E-MAIL SECURITY SYSTEM TO IDENTIFY POTENTIAL MALWARE CONTAINING E-MAILS ADDRESSED TO THE USER COMPUTING SYSTEM OPERATION 519, in the case where the suspicious e-mail parameter is the subject header of the identified potential malware containing e-mails, the incoming e-mail is checked for an exact match of the subject value, as well as the presence of a non-image binary attachment.

As another example, in one embodiment, at USE THE SUSPICIOUS E-MAIL IDENTIFICATION PARAMETER AND THE E-MAIL SECURITY SYSTEM TO IDENTIFY POTENTIAL MALWARE CONTAINING E-MAILS ADDRESSED TO THE USER COMPUTING SYSTEM OPERATION 519, in the case where the suspicious e-mail parameter is the filename of any attachment to the identified potential malware containing e-mails, the MIME headers are checked for the values, and by the unpacking of archive file type attachments and checking the names of packed files.

As another example, in one embodiment, at USE THE SUSPICIOUS E-MAIL IDENTIFICATION PARAMETER AND THE E-MAIL SECURITY SYSTEM TO IDENTIFY POTENTIAL MALWARE CONTAINING E-MAILS ADDRESSED TO THE USER COMPUTING SYSTEM OPERATION 519, in the case where the suspicious e-mail parameter is the set of character strings found within the attachments to the identified potential malware containing e-mails, the e-mail is checked for the presence of a suitable attachment, or files extracted from an archive type file attachment. These binary files are then scanned for the presence of one or more of the character strings.

In one embodiment, once the suspicious e-mail parameters of DISTRIBUTE THE SUSPICIOUS E-MAIL IDENTIFICATION PARAMETER TO AN E-MAIL SECURITY SYSTEM ASSOCIATED WITH A USER COMPUTING SYSTEM OPERATION 517 are used to identify potential malware containing e-mails at USE THE SUSPICIOUS E-MAIL IDENTIFICATION PARAMETER AND THE E-MAIL SECURITY SYSTEM TO IDENTIFY POTEN- TIAL MALWARE CONTAINING E-MAILS ADDRESSED TO THE USER COMPUTING SYSTEM OPERATION 519, process flow proceeds to TAKE ONE OF MORE ACTIONS TO PROTECT THE USER COMPUTING SYSTEM FROM THE IDENTIFIED POTENTIAL MALWARE CONTAINING E MAILS ADDRESSED TO THE USER COMPUTING SYSTEM OPERATION 521.

In one embodiment, at TAKE ONE OF MORE ACTIONS TO PROTECT THE USER COMPUTING SYSTEM FROM THE IDENTIFIED POTENTIAL MALWARE CONTAINING E MAILS ADDRESSED TO THE USER COMPUTING SYSTEM OPERATION 521 once the suspicious e-mail parameters of DISTRIBUTE THE SUSPICIOUS E-MAIL IDENTIFICATION PARAMETER TO AN E-MAIL SECURITY SYSTEM ASSOCIATED WITH A USER COMPUTING SYSTEM OPERATION 517 are used to identify potential malware containing e-mails at USE THE SUSPICIOUS E-MAIL IDENTIFICATION PARAMETER AND THE E-MAIL SECURITY SYSTEM TO IDENTIFY POTENTIAL MALWARE CONTAINING E-MAILS ADDRESSED TO THE USER COMPUTING SYSTEM OPERATION 519 the e-mails identified at USE THE SUSPICIOUS E-MAIL IDENTIFICATION PARAMETER AND THE E-MAIL SECURITY SYSTEM TO IDENTIFY POTENTIAL MALWARE CONTAINING E-MAILS ADDRESSED TO THE USER COMPUTING SYSTEM OPERATION 519 are subjected to one or more actions to protect a user computing system.

In various embodiments, at TAKE ONE OF MORE ACTIONS TO PROTECT THE USER COMPUTING SYSTEM FROM THE IDENTIFIED POTENTIAL MALWARE CONTAINING E MAILS ADDRESSED TO THE USER COMPUTING SYSTEM OPERATION 521 the presence of a suspicious e-mail parameter within an email may be taken as evidence of the email containing malware, or many such matches may need to be taken before the email is considered as malware, or the presence of one or more suspicious e-mail parameters may be considered in the context of a larger malware detection system, as partially contributing to the detection of malware.

In one embodiment, at TAKE ONE OF MORE ACTIONS TO PROTECT THE USER COMPUTING SYSTEM FROM THE IDENTIFIED POTENTIAL MALWARE CONTAINING E MAILS ADDRESSED TO THE USER COMPUTING SYSTEM OPERATION 521 the e-mails identified at USE THE SUSPICIOUS E-MAIL IDENTIFICATION PARAMETER AND THE E-MAIL SECURITY SYSTEM TO IDENTIFY POTENTIAL MALWARE CONTAINING E-MAILS ADDRESSED TO THE USER COMPUTING SYSTEM OPERATION 519 are subjected to one or more actions to protect a user computing system by a user computing system, such as user computing system 100 of FIG. 4.

In one embodiment, at TAKE ONE OF MORE ACTIONS TO PROTECT THE USER COMPUTING SYSTEM FROM THE IDENTIFIED POTENTIAL MALWARE CONTAINING E MAILS ADDRESSED TO THE USER COMPUTING SYSTEM OPERATION 521 the e-mails identified at USE THE SUSPICIOUS E-MAIL IDENTIFICATION PARAMETER AND THE E-MAIL SECURITY SYSTEM TO IDENTIFY POTENTIAL MALWARE CONTAINING E-MAILS ADDRESSED TO THE USER COMPUTING SYSTEM OPERATION 519 are subjected to one or more actions to protect a user computing system by a security system provider computing system, such as security system provider computing system 150 of FIG. 3.

In one embodiment, at TAKE ONE OF MORE ACTIONS TO PROTECT THE USER COMPUTING SYSTEM FROM THE IDENTIFIED POTENTIAL MALWARE CONTAINING E MAILS ADDRESSED TO THE USER COMPUTING SYSTEM OPERATION 521 the e-mails identified at USE THE SUSPICIOUS E-MAIL IDENTIFICATION PARAMETER AND THE E-MAIL SECURITY SYSTEM TO IDENTIFY POTENTIAL MALWARE CONTAINING E-MAILS ADDRESSED TO THE USER COMPUTING SYSTEM OPERATION 519 are subjected to one or more actions to protect a user computing system using one or more processors, such as CPUs 201 of FIG. 2, 301 of FIG. 3, and/or 401 of FIG. 4, associated with one or more computing systems, such as honeypot computing system 120 of FIG. 2, security system provider computing system 150 of FIG. 3, and/or user computing system(s) 100 of FIG. 4.

In one embodiment, at TAKE ONE OF MORE ACTIONS TO PROTECT THE USER COMPUTING SYSTEM FROM THE IDENTIFIED POTENTIAL MALWARE CONTAINING E MAILS ADDRESSED TO THE USER COMPUTING SYSTEM OPERATION 521 the e-mails identified at USE THE SUSPICIOUS E-MAIL IDENTIFICATION PARAMETER AND THE E-MAIL SECURITY SYSTEM TO IDENTIFY POTENTIAL MALWARE CONTAINING E-MAILS ADDRESSED TO THE USER COMPUTING SYSTEM OPERATION 519 are subjected to one or more actions to protect a user computing system using filter module, such as filter module 349 of FIG. 3 and/or 449 of FIG. 4.

In one embodiment, if a suspicious e-mail parameter has not been observed within a defined number of e-mails received by spam e-mail honeypot OF PROVIDE A SPAM E-MAIL HONEYPOT OPERATION 503 within a defined time frame, then the suspicious e-mail parameter is removed and transformed back to the status of a feature to avoid false positive results by one or more processors associated with one or more computing systems. In one embodiment, the removal of the suspicious e-mail parameter is communicated to the one or more security systems associated with one or more non-honeypot e-mail systems by one or more processors associated with one or more computing systems. In one embodiment, the removal of the suspicious e-mail parameter expires automatically after a certain time period if it has not been renewed.

In one embodiment, once the suspicious e-mail parameters of DISTRIBUTE THE SUSPICIOUS E-MAIL IDENTIFICATION PARAMETER TO AN E-MAIL SECURITY SYSTEM ASSOCIATED WITH A USER COMPUTING SYSTEM OPERATION 517 are used to identify potential malware containing e-mails at USE THE SUSPICIOUS E-MAIL IDENTIFICATION PARAMETER AND THE E-MAIL SECURITY SYSTEM TO IDENTIFY POTENTIAL MALWARE CONTAINING E-MAILS ADDRESSED TO THE USER COMPUTING SYSTEM OPERATION 519 and the e-mails identified at USE THE SUSPICIOUS E-MAIL IDENTIFICATION PARAMETER AND THE E-MAIL SECURITY SYSTEM TO IDENTIFY POTENTIAL MALWARE CONTAINING E-MAILS ADDRESSED TO THE USER COMPUTING SYSTEM OPERATION 519 are subjected to one or more actions to protect a user computing system at TAKE ONE OF MORE ACTIONS TO PROTECT THE USER COMPUTING SYSTEM FROM THE IDENTIFIED POTENTIAL MALWARE CONTAINING E MAILS ADDRESSED TO THE USER COMPUTING SYSTEM OPERATION 521, process flow proceeds to EXIT OPERATION 431 where process for employing honeypot systems to identify potential malware containing messages 500 is exited to await new data.

Using process for employing honeypot systems to identify potential malware containing messages 500, in contrast to prior art and current teachings, the significant number of malware containing e-mails received by spam e-mail honeypots is used as a source of data to improve detection rates of malware containing e-mails in a user computing system based environment, i.e., a non-spam e-mail honeypot environment such as a real e-mail system. Therefore, using process for employing honeypot systems to identify potential malware containing messages 500, malware containing e-mails can be identified and stopped more frequently and efficiently than is possible using currently available methods and systems.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Herein, embodiments have been discussed with reference to the accompanying FIG.s, which depict one or more exemplary embodiments. The above description includes reference to specific embodiments for illustrative purposes. However, the illustrative discussion above is not intended to be exhaustive or to limit the invention to the precise forms disclosed. Many modifications and variations are possible in view of the teachings below. The embodiments discussed above were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below. In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "providing", "receiving", "analyzing", "extracting", "generating", "sending", "capturing", "monitoring", "obtaining", "requesting", "storing", "saving", "classifying", "comparing", "calculating", "processing", "using", "filtering", "extracting", "defining", "detecting", "transforming", "distributing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicably coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for employing honeypot systems to identify potential malware containing messages comprising:
   providing one or more honeypot computing systems;
   providing one or more decoy e-mail addresses associated with the one or more honeypot computing systems;
   receiving one or more e-mails at one of the one or more decoy e-mail addresses associated with the one or more honeypot computing systems;
   using one or more processors associated with one or more computing systems to perform a preliminary filtering of the one or more e-mails received at the one or more decoy e-mail addresses associated with one or more honeypot computing systems;
   as a result of the preliminary filtering of the one or more e-mails received at the one or more decoy e-mail addresses associated with one or more honeypot computing systems, identifying one or more of the one or more e-mails as potential malware containing e-mails;
   using one or more processors associated with one or more computing systems to extract a feature or feature value associated with one or more of the identified potential malware containing e-mails, wherein the identified potential malware containing e-mails comprise various respective sets of feature or feature values, each set of feature values comprising a plurality of individual feature values, wherein a plurality of the identified potential malware containing e-mails have at least one individual feature value in common;
   defining a burst threshold for the individual feature or feature value such that when the individual feature or feature value occurs in a number of emails exceeding the burst threshold number of times in a defined period of time, the feature or feature value is considered an indicator of malware containing e-mail;
   using one or more processors associated with one or more computing systems to detect that the extracted feature or feature value occurs in a number of emails more than the burst threshold number of times in the defined period of time;
   responsive to the detection, transforming a status of the individual feature or feature value from a first feature status into a status of suspicious e-mail parameter;
   using one or more processors associated with one or more computing systems to distribute the suspicious e-mail parameter to one or more security systems or one or more e-mail systems for use in identifying potential malware containing e-mails being sent to one or more user computing systems through the one or more security systems or the one or more e-mail systems; and
   determining that the suspicious e-mail parameter has not been observed within a predefined number of e-mails within a predefined time frame, and transforming, as a result of the determination, the suspicious e-mail parameter back to the status of a feature.

2. The computing system implemented process for employing honeypot systems to identify potential malware containing messages of claim 1, wherein:
   the preliminary filtering of the one or more e-mails received at the one or more decoy e-mail addresses associated with one or more honeypot computing systems includes implementing a heuristic using one or more processors associated with one or more computing systems that excludes all e-mails of the one or more e-mails received at the one or more decoy e-mail addresses associated with one or more honeypot computing systems that are text only e-mails, or excludes all emails that do not include a binary attachment, or excludes all emails that have only image based binary attachments, the excludes emails being removed from further processing by the computing system implemented process for employing honeypot systems to identify potential malware containing messages.

3. The computing system implemented process for employing honeypot systems to identify potential malware containing messages of claim 1, wherein:
   for a extracted feature type of the extracted feature or feature value associated with the identified potential malware containing e-mails, the feature type is extracted from the identified potential malware containing e-mails and compared with a white list of known feature type values and a white list rule base describing patterns within the feature type values that are commonly found within legitimate e-mails and any feature value associated with the identified potential malware containing e-mails that is found within the white list or that matches a rule within the white list rule base is considered a legitimate feature value and not a candidate for being transformed into a suspicious e-mail parameter.

4. The computing system implemented process for employing honeypot systems to identify potential malware containing messages of claim 1, wherein:
   the extracted feature or feature value associated with the identified potential malware containing e-mails is the subject header of the identified potential malware containing e-mails.

5. The computing system implemented process for employing honeypot systems to identify potential malware containing messages of claim 1, wherein:
   the extracted feature or feature value associated with the identified potential malware containing e-mails is the filename of any attachment to the identified potential malware containing e-mails.

6. The computing system implemented process for employing honeypot systems to identify potential malware containing messages of claim 1, wherein:
   the extracted feature or feature value associated with the identified potential malware containing e-mails is the filenames of files contained within any archive file attachments to identified potential malware containing e-mails.

7. The computing system implemented process for employing honeypot systems to identify potential malware containing messages of claim 1, wherein:
   the extracted feature or feature value associated with the identified potential malware containing e-mails is a defined character string.

8. A system for employing honeypot systems to identify potential malware containing messages comprising:
   one or more honeypot computing systems;
   at least one computing system;
   at least one e-mail system;

at least one processor associated with the at least one computing system, the at least one processor associated with the at least one computing system executing at least part of a computing system implemented process for employing honeypot systems to identify potential malware containing messages, the computing system implemented process for employing honeypot systems to identify potential malware containing messages comprising:

providing one or more decoy e-mail addresses associated with the one or more honeypot computing systems;

receiving one or more e-mails at one of the one or more decoy e-mail addresses associated with the one or more honeypot computing systems;

using the at least one processor associated with the at least one computing system to perform a preliminary filtering of the one or more e-mails received at the one or more decoy e-mail addresses associated with one or more honeypot computing systems;

as a result of the preliminary filtering of the one or more e-mails received at the one or more decoy e-mail addresses associated with one or more honeypot computing systems, identifying one or more of the one or more e-mails as potential malware containing e-mails;

using the at least one processor associated with the at least one computing system to extract a feature or feature value associated with one or more of the identified potential malware containing e-mails, wherein the identified potential malware containing e-mails comprise various respective sets of feature or feature values, each set of feature values comprising a plurality of individual feature values, wherein a plurality of the identified potential malware containing e-mails have at least one individual feature value in common;

defining a burst threshold for the individual feature or feature value such that when the individual feature or feature value occurs in a number of emails exceeding the burst threshold number of times in a defined period of time, the feature or feature value is considered an indicator of malware containing e-mail;

using the at least one processor associated with the at least one computing system to detect that the extracted feature or feature value occurs in a number of emails more than the burst threshold number of times in the defined period of time;

responsive to the detection, transforming a status of the individual feature or feature value from a first feature status into a status of suspicious e-mail parameter;

using the at least one processor associated with the at least one computing system to distribute the suspicious e-mail parameter to one or more security systems or the at least one e-mail system for use in identifying potential malware containing e-mails being sent to one or more user computing systems through the one or more security systems or the at least one e-mail system; and determining that the suspicious e-mail parameter has not been observed within a predefined number of e-mails within a predefined time frame, and transforming, as a result of the determination, the suspicious e-mail parameter back to the status of a feature.

9. The system for employing honeypot systems to identify potential malware containing messages comprising of claim 8, wherein:

the preliminary filtering of the one or more e-mails received at the one or more decoy e-mail addresses associated with one or more honeypot computing systems includes implementing a heuristic using one or more processors associated with one or more computing systems that excludes all e-mails of the one or more e-mails received at the one or more decoy e-mail addresses associated with one or more honeypot computing systems that are text only e-mails, or excludes all emails that do not include a binary attachment, or excludes all emails that have only image based binary attachments, the excludes emails being removed from further processing by the computing system implemented process for employing honeypot systems to identify potential malware containing messages.

10. The system for employing honeypot systems to identify potential malware containing messages comprising of claim 8, wherein:

for a extracted feature type of the extracted feature or feature value associated with the identified potential malware containing e-mails, the feature type is extracted from the identified potential malware containing e-mails and compared with a white list of known feature type values and a white list rule base describing patterns within the feature type values that are commonly found within legitimate e-mails and any feature value associated with the identified potential malware containing e-mails that is found within the white list or that matches a rule within the white list rule base is considered a legitimate feature value and not a candidate for being transformed into a suspicious e-mail parameter.

11. The system for employing honeypot systems to identify potential malware containing messages comprising of claim 8, wherein:

the extracted feature or feature value associated with the identified potential malware containing e-mails is the subject header of the identified potential malware containing e-mails.

12. The system for employing honeypot systems to identify potential malware containing messages comprising of claim 8, wherein:

the extracted feature or feature value associated with the identified potential malware containing e-mails is the filename of any attachment to the identified potential malware containing e-mails.

13. The system for employing honeypot systems to identify potential malware containing messages comprising of claim 8, wherein:

the extracted feature or feature value associated with the identified potential malware containing e-mails is the filenames of files contained within any archive file attachments to identified potential malware containing e-mails.

14. The system for employing honeypot systems to identify potential malware containing messages comprising of claim 8, wherein:

the extracted feature or feature value associated with the identified potential malware containing e-mails is a defined character string.

15. A method for employing honeypot systems to identify potential malware containing messages comprising:

providing one or more honeypot computing systems;

providing one or more decoy e-mail addresses associated with the one or more honeypot computing systems;

receiving one or more e-mails at one of the one or more decoy e-mail addresses associated with the one or more honeypot computing systems;

performing a preliminary filtering of the one or more e-mails received at the one or more decoy e-mail addresses associated with one or more honeypot computing systems;

as a result of the preliminary filtering of the one or more e-mails received at the one or more decoy e-mail addresses associated with one or more honeypot computing systems, identifying one or more of the one or more e-mails as potential malware containing e-mails;

extracting a feature or feature value associated with one or more of the identified potential malware containing e-mails, wherein the identified potential malware containing e-mails comprise various respective sets of feature or feature values, each set of feature values comprising a plurality of individual feature values, wherein a plurality of the identified potential malware containing e-mails have at least one individual feature value in common;

defining a burst threshold for the individual feature or feature value such that when the individual feature or feature value occurs in a number of emails exceeding the burst threshold number of times in a defined period of time, the feature or feature value is considered an indicator of malware containing e-mail;

detecting that the extracted feature or feature value occurs in a number of emails more than the burst threshold number of times in the defined period of time;

responsive to the detection, transforming a status of the individual feature or feature value from a first feature status into a status of suspicious e-mail parameter;

distributing the suspicious e-mail parameter to one or more security systems or one or more e-mail systems for use in identifying potential malware containing e-mails being sent to one or more user computing systems through the one or more security systems or the one or more e-mail systems; and determining that the suspicious e-mail parameter has not been observed within a predefined number of e-mails within a predefined time frame, and transforming, as a result of the determination, the suspicious e-mail parameter back to the status of a feature.

16. The method for employing honeypot systems to identify potential malware containing messages of claim 15, wherein:

the preliminary filtering of the one or more e-mails received at the one or more decoy e-mail addresses associated with one or more honeypot computing systems includes implementing a heuristic using one or more processors associated with one or more computing systems that excludes all e-mails of the one or more e-mails received at the one or more decoy e-mail addresses associated with one or more honeypot computing systems that are text only e-mails, or excludes all emails that do not include a binary attachment, or excludes all emails that have only image based binary attachments, the excludes emails being removed from further processing by the computing system implemented process for employing honeypot systems to identify potential malware containing messages.

17. The method for employing honeypot systems to identify potential malware containing messages of claim 15, wherein:

for an extracted feature type of the extracted feature or feature value associated with the identified potential malware containing e-mails, the feature type is extracted from the identified potential malware containing e-mails and compared with a white list of known feature type values and a white list rule base describing patterns within the feature type values that are commonly found within legitimate e-mails and any feature value associated with the identified potential malware containing e-mails that is found within the white list or that matches a rule within the white list rule base is considered a legitimate feature value and not a candidate for being transformed into a suspicious e-mail parameter.

18. The method for employing honeypot systems to identify potential malware containing messages of claim 15, wherein:

the extracted feature or feature value associated with the identified potential malware containing e-mails is the subject header of the identified potential malware containing e-mails.

19. The method for employing honeypot systems to identify potential malware containing messages of claim 15, wherein:

the extracted feature or feature value associated with the identified potential malware containing e-mails is the filename of any attachment to the identified potential malware containing e-mails.

20. The method for employing honeypot systems to identify potential malware containing messages of claim 15, wherein:

extracted feature or feature value associated with the identified potential malware containing e-mails is the filenames of files contained within any archive file attachments to identified potential malware containing e-mails.

* * * * *